US005617507A

United States Patent [19]

Lee et al.

[11] Patent Number: 5,617,507

[45] Date of Patent: Apr. 1, 1997

[54] SPEECH SEGMENT CODING AND PITCH CONTROL METHODS FOR SPEECH SYNTHESIS SYSTEMS

[75] Inventors: Chong R. Lee; Yong K. Park, both of Seoul, Rep. of Korea

[73] Assignee: Korea Telecommunication Authority, Seoul, Rep. of Korea

[21] Appl. No.: 275,940

[22] Filed: Jul. 14, 1994

Related U.S. Application Data

[63] Continuation of Ser. No. 972,283, Nov. 5, 1992, abandoned.

[30] Foreign Application Priority Data

Nov. 6, 1991 [KR] Rep. of Korea .................... 91-19617

[51] Int. Cl.[6] ............................ G01L 1/06; G06F 15/00

[52] U.S. Cl. ...................... 395/2.09; 395/2.91; 395/2.94

[58] Field of Search ............................ 395/2, 2.09, 2.91, 395/2.94; 381/29–53

[56] References Cited

U.S. PATENT DOCUMENTS 3,700,815 10/1972 Doddington et al. .................... 381/42
4,912,768 3/1990 Benbassat ............................... 381/52
4,914,701 4/1990 Zibman .................................. 381/36

OTHER PUBLICATIONS

A Diphone Synthesis System Based on Time–Domain Prosodic Modification of Speech, pp. 238–241, vol. 1, *ICASSP* May 23–26, 1989, Hamon et al.

Improving Naturalness in Text–To–Speech Synthesis Using Natural Glottal Source, pp. 769–772, vol. 2, *ICASSP*, May 14–17, 1991, Matsui et al.

*Primary Examiner*—Allen R. MacDonald
*Assistant Examiner*—Indranil Chowdhury
*Attorney, Agent, or Firm*—Seed and Berry LLP

[57] ABSTRACT

The present invention relates to a method and system for synthesizing speech utilizing a periodic waveform decomposition and relocation coding scheme. According to the scheme, signals of voiced sound interval among original speech are decomposed into wavelets, each of which corresponds to a speech waveform for one period made by each glottal pulse. These wavelets are respectively coded and stored. The wavelets nearest to the positions where the wavelets are to be located are selected from stored wavelets and decoded. The decoded wavelets are superposed to each other such that original sound quality can be maintained and duration and pitch frequency of speech segment can be controlled arbitrarily.

8 Claims, 15 Drawing Sheets n (TIME)
T1
T2
T3
g1 (n)
g2(n)
g3(n)
g4(n)
P1
P2
P3
P4
a
b
c
d
e
S1(n)
S2(n)
S3 (n)
S4(n)
S(n)
k1
k2
k3
k4
h(n)1
h(n)2
h(n)3
h(n)4
e1(n)
e2(n)
e3(n)
e4(n)
n

SPEECH SEGMENT CODING AND PITCH CONTROL METHODS FOR SPEECH SYNTHESIS SYSTEMS

CROSS-REFERENCE TO RELATED APPLICATION

This application is a continuation of U.S. patent application Ser. No. 07/972,283, filed Nov. 5, 1992, abandoned.

BACKGROUND OF INVENTION

1. Field of the Invention

The invention relates to a speech synthesis system and a method of synthesizing speech, and more particularly, to a speech segment coding and a pitch control method which significantly improves the quality of the synthesized speech.

The principle of the present invention can be directly applied not only to speech synthesis but also to synthesis of other sounds, such as, the sounds of musical instruments or singing, each of which has a property similar to that of speech, or to a very low rate speech coding or speech rate conversion. The present invention will be described below concentrating on speech synthesis.

There are speech synthesis methods for implementing a text-to-speech synthesis system which can synthesize countless vocabularies by converting text, that is, character strings, into speech. However a method which is easy to implement and most generally utilized is speech segmental synthesis method, also called synthesis-by-concatenation method, in which the human speech is sampled and analyzed into phonetic units, such as demisyllables or diphones, to obtain short speech segments, which are then coded and stored in memory, and when the text is inputted, it is converted into phonetic transcriptions. Speech segments corresponding to the phonetic transcriptions are then sequentially retrieved from the memory and decoded to synthesize the speech corresponding to the input text.

In this type of segmental speech synthesis method, one of the most important elements to govern the quality of the synthesized speech is the coding method of the speech segments. In the prior art speech segmental synthesis method of the speech synthesis system, a vocoding method of low speech quality is mainly used as the speech coding method for storing speech segments. However this is one of the most important causes which lowers the quality of synthesized speech. A brief description with respect to the prior art speech segment coding method follows.

The speech coding method can be largely classified into a waveform coding method of good speech quality and a vocoding method of low speech quality. Since the waveform coding method is a method which intends to transfer the speech waveform as it is, it is very difficult to change pitch frequency and duration so that it is impossible to adjust intonation and rate of speech when performing the speech synthesis. Also it is impossible to conjoin the speech segments therebetween smoothly so that the waveform coding method is basically not suitable for coding the speech segments.

On the contrary, when the vocoding method (also called an analysis-synthesis method) is used, the pitch pattern and the duration of the speech segment can be arbitrarily changed. Further, since the speech segments can also be smoothly conjoined by interpolating the spectral envelope estimation parameters so that the vocoding method is suitable for the coding means for text-to-speech synthesis, vocoding methods, such as linear predictive coding (LPC) or formant vocoding, is adopted in most present speech synthesis systems. However, since the quality of decoded speech is low when the speech is coded using the vocoding method, the synthesized speech obtained by decoding the stored speech segments and concatenating them can not have better speech quality than that offered by the vocoding method.

Attempts made so far to improve speech quality offered by the vocoding method replaces the impulse train used with an excitation signal that has a less artificial waveform. One such attempt was to utilize, a waveform having peakiness lower than that of the impulse, for example a triangular waveform or a half circle waveform or a waveform similar to a glottal pulse. Another attempt was to select a sample pitch pulse of one or some of residual signal pitch periods obtained by inverse filtering and to utilize instead of the impulse, one sample pulse for the entire time period or for a substantially long time period. However, such attempts to replace the impulse with an excitation pulse of other waveforms have not improved the speech quality or have improved it only slightly, if ever, and have never obtained synthesized speech with a quality proximating that of natural speech.

It is the object of the present invention to synthesize high quality speech having a naturalness and an intelligibility with the same degree as that of human speech by utilizing a novel speech segment coding method enabling good speech quality and pitch control. The method of the present invention combines the merits of the waveform coding method which provides good speech quality but without the ability to control the pitch and the vocoding method which provides pitch control but has low speech quality.

The present invention utilizes a periodic waveform decomposition method which is a coding method which decomposes a signal in a voiced sound sector in the original speech into wavelets equivalent to one-period speech waveforms made by glottal pulses to code and store the decomposed signal, and a time warping-based wavelet relocation method which is a waveform synthesis method capable of arbitrary adjustment of the duration and pitch frequency of the speech segment while maintaining the quality of the original speech by selecting wavelets nearest to positions where wavelets are to be placed among stored wavelets, then by decoding the selected wavelets and superposing them. For purposes of this invention musical sounds are treated as voiced sounds.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

Speech segment coding and pitch control methods for speech synthesis systems of the present invention are defined by the claims with specific embodiments shown in the attached drawings. For the purpose of summarizing the invention, the invention relates to a method capable of synthesizing speech that proximates the quality of natural speech by adjusting its duration and pitch frequency by waveform-coding wavelets of each period, storing them in memory, and at the time of synthesis, decoding them and locating them at appropriate time points such that they have the desired pitch pattern and then superposing them to generate natural speech, singing, music and the like.

The present invention includes a speech segment coding method for use with a speech synthesis system, where the method comprises the forming of wavelets by obtaining parameters which represent a spectral envelope in each analysis time interval. This is done by analyzing a periodic or quasi-periodic digital signal, such as voiced speech, with the spectrum estimation technique. An original signal is first deconvolved into an impulse response represented by the spectral envelope parameters and a periodic or quasiperiodic pitch pulse train signal having a nearly flat spectral envelope. An excitation signal obtained by appending zero-valued samples after a pitch pulse signal of one period obtained by segmenting the pitch pulse train signal period by period so that one pitch pulse is contained in each period and an impulse response corresponding to a set of spectral envelope parameters in the same time interval as the excitation signal are convolved to form a wavelet for that period.

The wavelets, rather than being formed by waveform-coding and stored in memory in advance, may be formed by mating information obtained by waveform-coding a pitch pulse signal of each period interval, obtained by segmentation, with information obtained by coding a set of spectral envelope estimation parameters with the same time interval as the above information, or with an impulse response corresponding to the parameters and storing the wavelet information in memory. There are two methods of producing synthetic speech by using the wavelet information stored in memory. The first method is to constitute each wavelet by convolving an excitation signal obtained by appending zero-valued samples after a pitch pulse signal of one period obtained by decoding the information and an impulse response corresponding to the decoded spectral envelope parameters in the same time interval as the excitation signal, and then to assign the wavelets to appropriate time points such that they have desired pitch pattern and duration pattern, locate them at the time points, and then superpose them.

The second method is to constitute a synthetic excitation signal by assigning the pitch pulse signals obtained by decoding the wavelet information to appropriate time points such that they have desired pitch pattern and duration pattern and locating them at the time points, and constitute a set of synthetic spectral envelope parameters either by temporally compressing or expanding the set of time functions of the parameters on a subsegment-by-subsegment basis, depending on whether the duration of a subsegment in a speed segment to be synthesized is shorter or longer than that of a corresponding subsegment in the original speech segment, respectively, or by locating the set of time functions of the parameters of one period synchronously with the mated pitch pulse signal of one period located to form the synthetic excitation signal, and to convolve the synthetic excitation signal and an impulse response corresponding to the synthetic spectral envelope parameter set by utilizing a time-varying filter or by using an FFT(Fast Fourier Transform)-based fast convolution technique. In the latter method, a blank interval occurs when a desired pitch period is longer than the original pitch period and an overlap interval occurs when the desired pitch period is shorter than the original pitch period.

In the overlap interval, the synthetic excitation signal is obtained by adding the overlapped pitch pulse signals to each other or by selecting one of them, and the spectral envelope parameter is obtained by selecting either one of the overlapped spectral envelope parameters or by using an average value of the two overlapped parameters.

In the blank interval, the synthetic excitation signal is obtained by filling it with zero-valued samples, and the synthetic spectral envelope parameter is obtained by repeating the values of the spectral envelope parameters at the beginning and ending points of the proceeding and following periods before and after the center of the blank interval, or by repeating one of the two values or an average value of the two values, or by filling it with values and smoothly connecting the two values.

The present invention further includes a pitch control method of a speech synthesis system capable of controlling duration and pitch of a speech segment by a time warping-based wavelet relocation method which makes it possible to synthesize speech with almost the same quality as that of natural speech, by coding important boundary time points such as the starting point, the end point and the steady-state points in a speech segment and pitch pulse positions of each wavelet or each pitch pulse signal and storing them in memory simultaneously at the time of storing each speech segment, and at the time of synthesis, obtaining a time-warping function by comparing desired boundary time points and original boundary time points stored corresponding to the desired boundary time points, finding out the original time points corresponding to each desired pitch pulse position by utilizing the time-warping function, selecting wavelets having pitch pulse positions nearest to the original time points and locating them at desired pitch pulse positions, and superposing the wavelets.

The pitch control method may further include producing synthetic speech by selecting pitch pulse signals of one period and spectral envelope parameters corresponding to the pitch pulse signals, instead of the wavelets, and locating them, and convolving the located pitch pulse signals and impulse response corresponding to the spectral envelope parameters to produce wavelets and superposing the produced wavelets, or convolving a synthetic excitation signal obtained by superposing the located pitch pulse signals and a time-varying impulse response corresponding to a synthetic spectral envelope parameters made by concatenating the located spectral envelope parameters.

A voiced speech synthesis device of a speech synthesis system is disclosed and includes a decoding subblock 9 producing wavelet information by decoding wavelet codes from the speech segment storage block 5. A duration control subblock 10 produces time-warping data from input of duration data from a prosodics generation subsystem 2 and boundary time points included in header information from the speech segment storage block 5. A pitch control subblock 11 produces pitch pulse position information such that it has an intonation pattern as indicated by an intonation pattern data from input of the header information from the speech segment storage block 5, the intonation pattern data from the prosodics generation subsystem and the time-warping information from the duration control subblock 10. An energy control subblock 12 produces gain information such that synthesized speech has the stress pattern as indicated by stress pattern data from input of the stress pattern data from the prosodics generation subsystem 2, the time-warping information from the duration control subblock 10 and pitch pulse position information from the pitch control subblock 11. A waveform assembly subblock 13 produces a voiced speech signal from input of the wavelet information from the decoding subblock 9, the time-warping information from the duration control subblock 10, the pitch pulse position information from the pitch control subblock 11 and the gain information from the energy control subblock 12.

Thus, according to the present invention, text is inputted to the phonetic preprocessing subsystem 1 where it is converted into phonetic transcriptive symbols and syntatic analysis data. The syntatic analysis data is outputted to a prosodics generation subsystem 2. The prosodics generation subsystem 2 outputs prosodic information to the speech segment concatenation subsystem 3. The phonetic transcriptive symbols output from the preprocessing subsystem is also inputted to the speech segment concatenation subsystem 3. The phonetic transcriptive symbols are then inputted to the speech segment selection block 4 and the corresponding prosodic data are inputted to the voiced sound synthesis block 6 and to the unvoiced sound synthesis block 7. In the speech segment selection block 4 each input phonetic transcriptive symbol is matched with a corresponding speech segment synthesis unit and a memory address of the matched synthesis unit corresponding to each input phonetic transcriptive symbol is found out from a speech segment table in the speech segment storage block 5. The address of the matched synthesis unit is then outputted to the speech segment storage block 5 where the corresponding speech segment in coded wavelet form is selected for each of the addresses of the matched synthesis units. The selected speech segment in coded wavelet form is outputted to the voiced sound synthesis block 6 for voiced sound and to the unvoiced sound synthesis block 7 for unvoiced sound. The voiced sound synthesis block 6, which uses the time warping-based wavelet relocation method to synthesize speech sound, and the unvoiced sound synthesis block 7 output digital synthetic speech signals, to the digital-to-analog converter for converting the input digital signals into analog signals which are the synthesized speech sounds.

To utilize the present invention, speech and/or music is first recorded on magnetic tape. The resulting sound is then converted from analog signals to digital signals by low-pass filtering the analog signals and then feeding the filtered signals to an analog-to-digital converter. The resulting digitized speech signals are then segmented into a number of speech segments having sounds which correspond to synthesis units, such as phonemes, diphones, demisyllables and the like, by using known speech editing tools. Each resulting speech segment is then differentiated into voiced and unvoiced speech segments by using known voiced/unvoiced detection and speech editing tools. The unvoiced speech segments are encoded by known vocoding methods which use white random noise as an unvoiced speech source. The vocoding methods include LPC, homomorphic, formant vocoding methods, and the like.

The voiced speech segments are used to form wavelets sj(n) according to the method disclosed below in FIG. 4. The wavelets sj(n) are then encoded by using an appropriate waveform coding method. Known waveform coding methods include Pulse Code Modulation (PCM), Adaptive Differential Pulse Code Modulation (ADPCM), Adaptive Predictive Coding (APC) and the like. The resulting encoded voiced speech segments are stored in the speech segment storage block 5 as shown in FIGS. 6A and 6B. The encoded unvoiced speech segments are also stored in the speech segment storage block 5.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying dawings in which.

Similar reference characters refer to similar parts throughout the several views of the drawings.

DETAILED DESCRIPTION OF THE INVENTION

The structure of the text-to-speech synthesis system of the prior art speech segment synthesis method consists of three subsystems:

A. A phonetic preprocessing subsystem (1);

B. A prosodics generation subsystem (2); and

Figure 1:
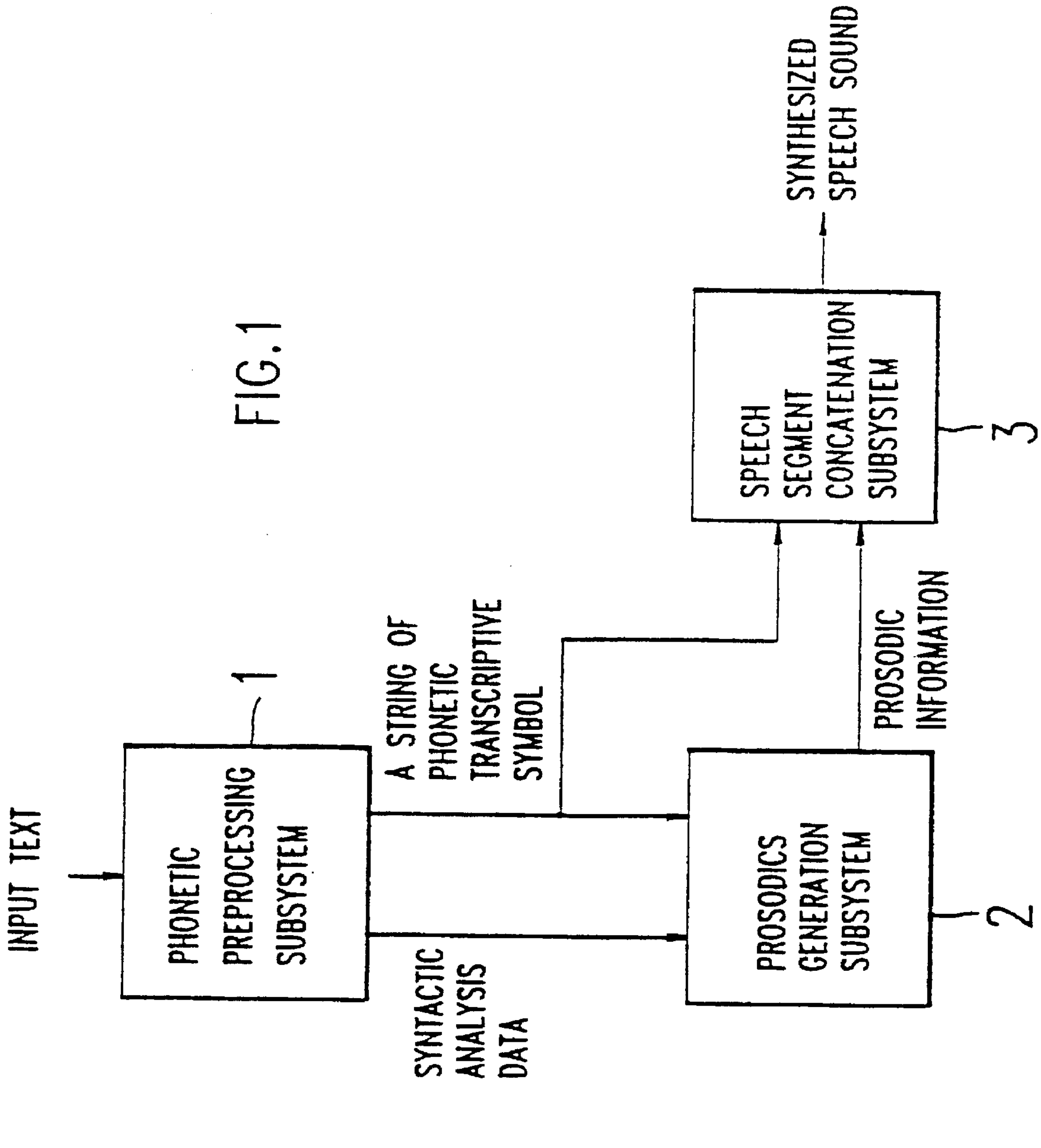
FIG. 1 illustrates the text-to-speech synthesis system of the speech segment synthesis method.

C. A speech segment concatenation subsystem (3) as shown in FIG. 1. When the text is input from a keyboard, a computer or any other system, to the text-to-speech synthesis system, the phonetic preprocessing subsystem (1) analyzes the syntax of the text and then changes the text to a string of phonetic transcriptive symbols by applying thereto phonetic recoding rules. The prosodics generation subsystem (2) generates intonation pattern data and stress pattern data utilizing syntactic analysis data so that appropriate intonation and stress can be applied to the string of phonetic transcriptive symbols, and then outputs the data to the speech segment concatenation subsystem (3). The prosodics generation subsystem (2) also provides the data with respect to the duration of each phoneme to the speech segment concatenation subsystem (3).

The above three prosodic data, i.e. the intonation pattern data, the stress pattern data and the data regarding the duration of each phoneme are, in general, sent to the speech segment concatenation subsystem (3) together with the string of the phonetic transcriptive symbols generated by the phonetic preprocessing subsystem (1), although they may be transferred to the speech segment concatenation subsystem (3) independently of the string of the phonetic transcriptive symbols.

The speech segment concatenation subsystem (3) generates continuous speech by sequentially fetching appropriate speech segments which are coded and stored in memory thereof according to the string of the phonetic transcriptive symbols (not shown) and by decoding them. At this time the speech segment concatenation subsystem (3) can generate synthetic speech having the intonation, stress and speech rate as intended by the prosodics generation subsystem (2) by controlling the energy (intensity), the duration and the pitch period of each speech segment according to the prosodic information.

The present invention remarkably improves speech quality in comparison with synthesized speech of the prior art by improving the coding method for storing the speech segments in the speech segment concatenation subsystem (3). A description with respect to the operation of the speech segment concatenation subsystem (3) with reference to FIG. 2 follows.

When the string of the phonetic transcriptive symbols formed by the phonetic preprocessing subsystem (1) is inputted to the speech segment selection block (4), the speech segment selection block (4) sequentially selects the synthesis units, such as diphones and demisyllables, by continuously inspecting the string of incoming phonetic transcriptive symbols, and finds out the addresses of the speech segments corresponding to the selected synthesis units from the memory thereof as in Table 1. Table 1 shows an example of the speech segment table kept in the speech segment selection block (4) which selects diphone-based speech segments. This results in the formation of an address of the selected speech segment being output to the speech segment storage block (5).

The speech segments corresponding to the addresses of the speech segment are coded according to the method of the present invention, to be described later, and are stored at the addresses of the memory of the speech segment storage block (5).

TABLE 1

| phonetic transcriptive symbol of speech segment | memory address (in hexadecimal) |
|---|---|
| /ai/ | 0000 |
| /au/ | 0021 |
| /ab/ | 00A3 |
| /ad/ | 00FF |
| . | . |
| . | . |
| . | . |

When the address of the selected speech segment from the speech segment selection block (4) is inputted to the speech segment storage block (5), the speech segment storage block (5) fetches the corresponding speech segment data from the memory in the speech segment storage block (5) and sends it to a voiced sound synthesis block (6) if it is a voiced sound or a voiced fricative sound, or to an unvoiced sound synthesis block (7) if it is an unvoiced sound. That is, the voiced sound synthesis block (6) synthesizes a digital speech signal corresponding to the voiced sound speech segments; and, the unvoiced sound synthesis block (7) synthesizes a digital speech signal corresponding to the unvoiced sound speech segment. Each digital synthesized speech signal of the voiced sound synthesis block (6) and the unvoiced sound synthesis block 7 is then converted into an analog signal.

Thus, the resulting digital synthesized speech signal output from the voiced sound synthesis block (6) or unvoiced sound synthesis block (7) is then sent to a D/A conversion block (8) consisting of a digital-to-analog converter, an analog low-pass filter and an analog amplifier, and is converted into an analog signal to provide synthesized speech sound.

When the voiced sound synthesis block (6) and the unvoiced sound synthesis block (7) concatenate the speech segments, they provide the prosody as intended by the prosodics generation subsystem (2) to synthesized speech by properly adjusting the duration, the intensity and the pitch frequency of the speech segment on the basis of the prosodic information, i.e., intonation pattern data, stress pattern data, duration data.

The preparation of the speech segment for storage in the speech segment storage block (5) is as follows. A synthesis unit is first selected. Such synthesis units include phoneme, allophone, diphone, syllable, demisyllable, CVC, VCV, CV, VC unit (here, "C" stands for a consonant, "V" stands for a vowel phoneme, respectively) or combinations thereof. The synthesis units which are most widely used in the current speech synthesis method are the diphones and the demisyllables.

The speech segment corresponding to each element of an aggregation of the synthesis units is segmented from the speech samples which are actually pronounced by a human. Accordingly, the number of elements of the synthesis unit aggregation is the same as the number of speech segments. For example, in case where demisyllables are used as the synthesis units in English, the number of demisyllables is about 1000 and, accordingly the number of the speech segments is also about 1000. In general, such speech segments consist of the unvoiced sound interval and the voiced sound interval.

In the present invention, the unvoiced speech segment and the voiced speech segment obtained by segmenting the prior art speech segment into the unvoiced sound interval and the voiced sound interval are used as the basic synthesis unit. The unvoiced sound speech synthesis portion is accomplished according to the prior art as discussed below. The voiced sound speech synthesis is accomplished according to the present invention.

Figure 2:
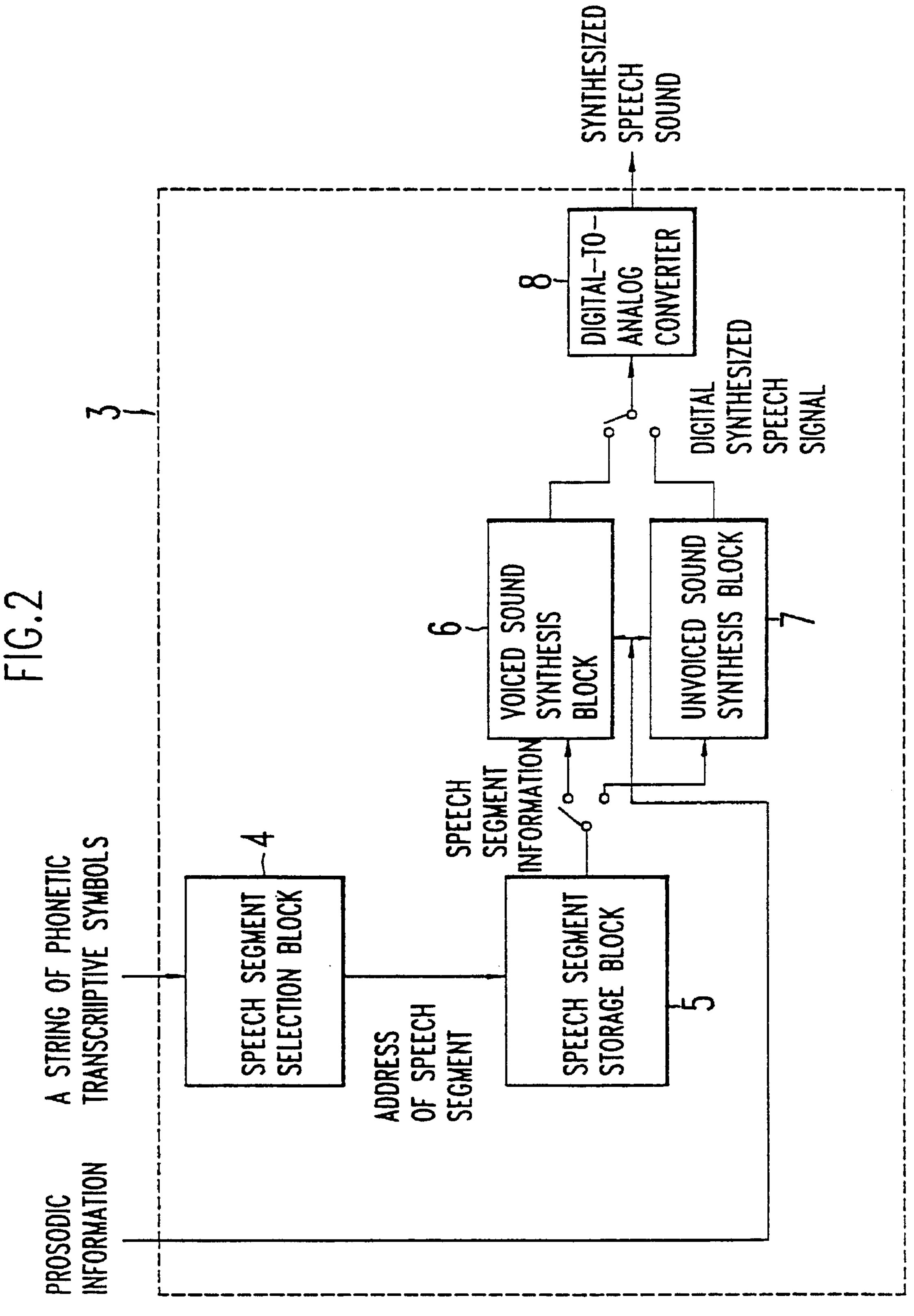
FIG. 2 illustrates the speech segment concatenation subsystem.

Thus, the unvoiced speech segments are decoded at the unvoiced sound synthesis block (7) shown in FIG. 2. In case of decoding the unvoiced sound, it has been noted in the prior art that the use of an artificial white random noise signal as an excitation signal for a synthesis filter does not aggravate or decrease the quality of the decoded speech. Therefore, in the coding and decoding of the unvoiced speech segments the prior art vocoding method can be applied as it is, in which method the white noise is used as the excitation signal. For example, in the prior art synthesis of unvoiced sound, the white noise signal can be generated by a random number generation algorithm and can be utilized, or the white noise signal generated in advance and stored in memory can be retrieved from memory when synthesizing, or a residual signal obtained by filtering the unvoiced sound interval of the actual speech utilizing an inverse spectral envelope filter and stored in memory can be retrieved from memory, when synthesizing. If it is not necessary to change the duration of the unvoiced speech segment, an extremely simple coding method can be utilized in which the unvoiced sound portion is coded according to a waveform coding method such as Pulse Code Modulation (PCM) or Adaptive Differential Pulse Code Modulation (ADPCM) and is stored. It is then decoded to be used, when synthesizing.

The present invention relates to a coding and synthesis method of the voiced speech segments which governs the quality of the synthesized speech. A description with respect to such a method with the emphasis on the speech segment storage block and the voiced sound synthesis block is (6) shown in FIG. 2.

The voiced speech segments among the speech segments stored in the memory of the speech segment storage block (5) are decomposed into wavelets of pitch periodic component in advance according to the periodic-waveform decomposition method of the present invention and stored therein. The voiced sound synthesis block (6) synthesizes speech having the desired pitch and the duration patterns by properly selecting and arranging the wavelets according to the time warping-based wavelet relocation method. The principle of these methods is described below with reference to the drawings.

Voiced speech s(n) is a periodic signal obtained when a periodic glottal wave generated at the vocal cords passes through the acoustical vocal tract filter V(f) consisting of the oral cavity, pharyngeal cavity and nasal cavity. Here, it is assumed that the vocal tract filter V(f) includes frequency characteristic due to a lip radiation effect. A spectrum S(f) of voiced speech is characterized by:

1. A fine structure varying rapidly with respect to frequency "f"; and
2. A spectral envelope varying slowly thereto, the former being due to periodicity of the voiced speech signal and the latter reflecting the spectrum of a glottal pulse and frequency characteristic of the vocal tract filter.

The spectrum S(f) of the voiced speech takes the same form as the form obtained when the fine structure of an impulse train due to harmonic components which exist at integer multiples of the pitch frequency Of is multiplied by a spectral envelope function H(f). Therefore, voiced speech s(n) can be regarded as an output signal when a periodic pitch pulse train signal e(n) having a flat spectral envelope and the same period as the voiced speech S(n) is input to a time-varying filter having the same frequency response characteristic as the spectral envelope function H(f) of the voiced speech s(n). Viewing this in the time domain, the voiced speech s(n) is a convolution of an impulse response h(n) of the filter H(f) and the periodic pitch pulse train signal e(n). Since H(f) corresponds to the spectral envelope function of the voiced speech s(n), the time-varying filter having H(f) as its frequency response characteristic is referred to as a spectral envelope filter or a synthesis filter.

Figures 3A, 3B, 3C, 3D, 3E, 3F:
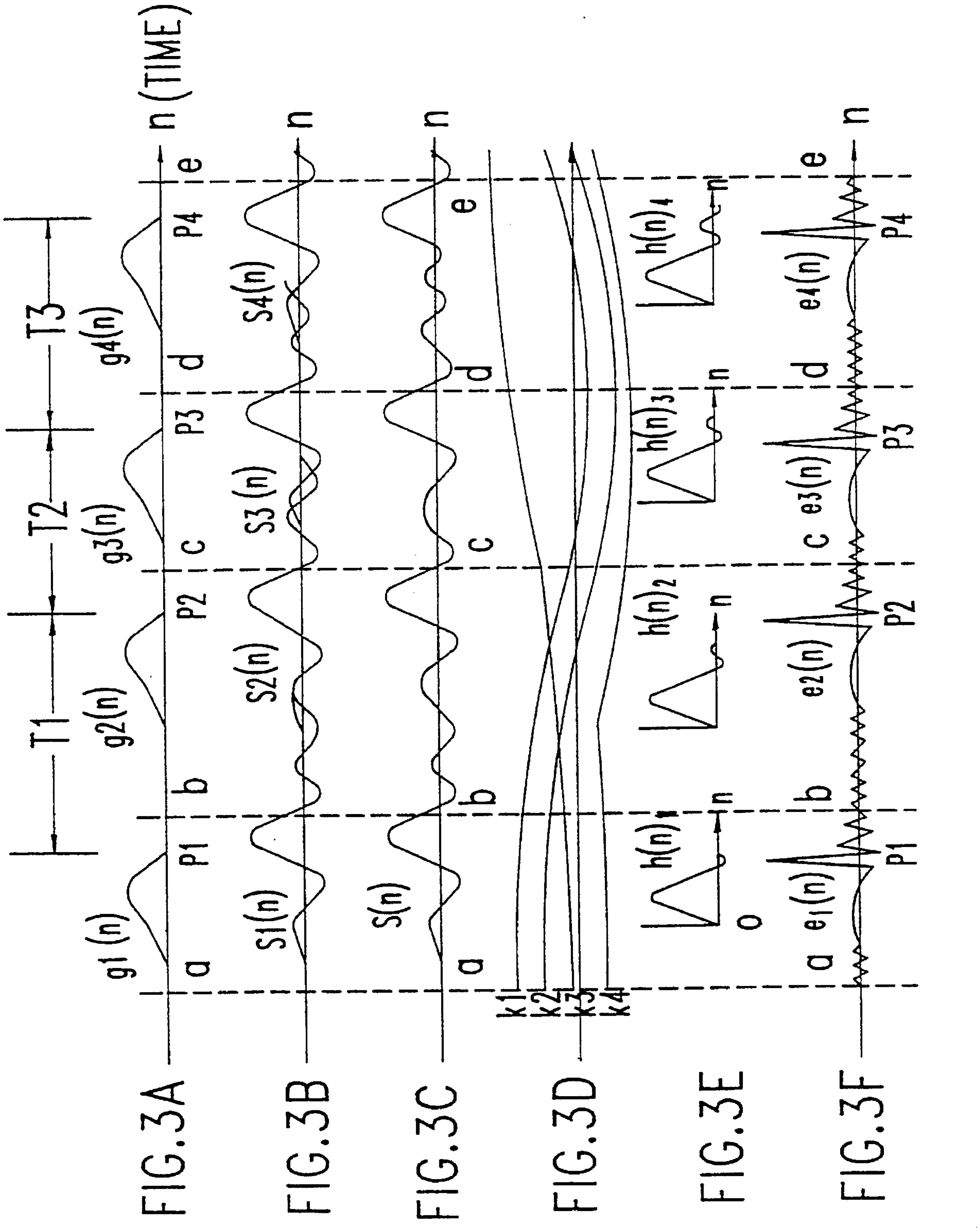
FIGS. 3A through 3T illustrate waveforms for explaining the principle of the periodic waveform decomposition method and the wavelet relocation method according to the present invention.

In FIG. 3A, a signal for 4 periods of a glottal waveform is illustrated. Commonly, the waveforms of the glottal pulses composing the glottal waveform are similar to each other but not completely identical, and also the interval time between the adjacent glottal pulses is similar to each other but not completely equal. As described above, the voiced speech waveform s(n) of FIG. 3C is generated when the glottal waveform g(n) shown in FIG. 3A is filtered by the vocal tract filter V(f). The glottal waveform g(n) consists of the glottal pulses g1(n), g2(2), g3(n) and g4(n) distinguished from each other in terms of time, and when they are filtered by the vocal tract filter V(f), the wavelets s1(n), s2(n), s3(n) and s4(n) shown in FIG. 3B are generated. The voiced speech waveform s(n) shown in FIG. 3C is generated by superposing such wavelets.

A basic concept of the present invention is that if one can obtain the wavelets which compose a voiced speech signal by decomposing the voiced speech signal, one can synthesize speech with arbitrary accent and intonation pattern by changing the intensity of the wavelets and the time intervals between them.

Because the voiced speech waveform s(n) shown in FIG. 3C was generated by superposing the wavelets which overlap with each other in time, it is difficult to get the wavelets back from the speech waveform s(n).

In order for the waveform of each period not to overlap with each other in the time domain, the waveform must be a peaky waveform in which the energy is concentrated about one point in time, as seen in FIG. 3F.

Figure 4:
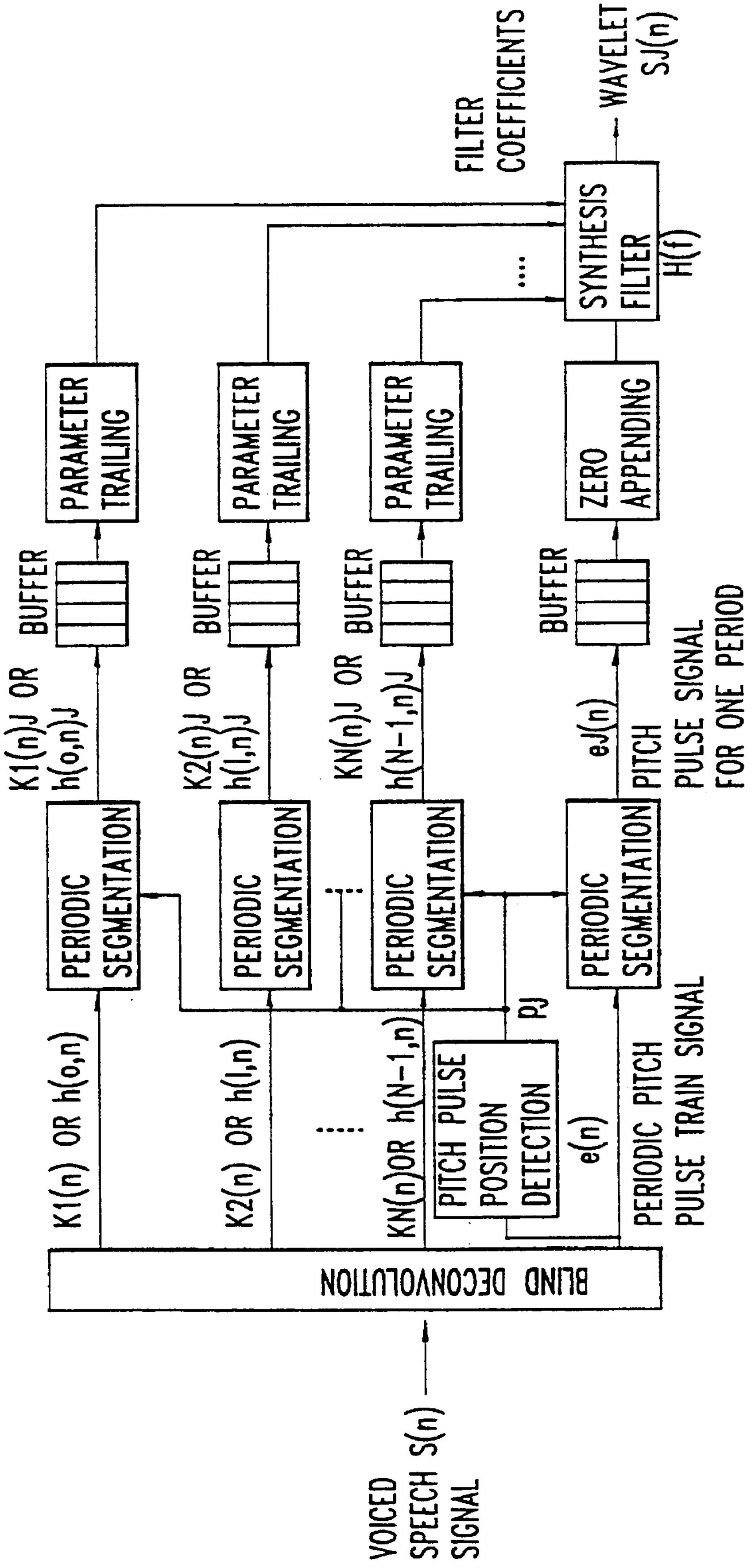
FIG. 4 illustrates a block diagram for explaining the periodic waveform decompostion method.
Figure 5A:
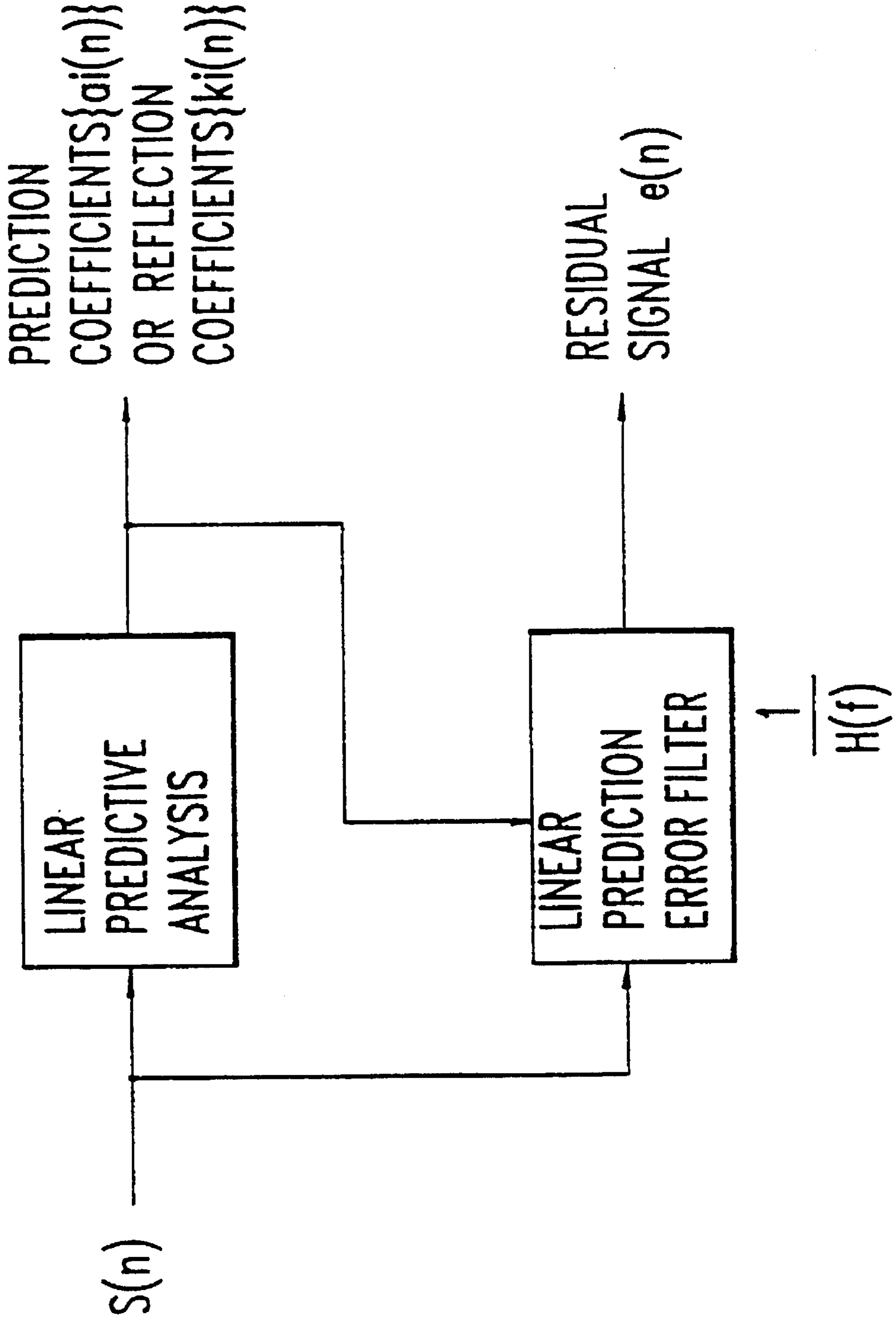
FIGS. 5A through 5E illustrate block diagrams for explaining the procedure of the blind deconvolution method.
Figure 5B:
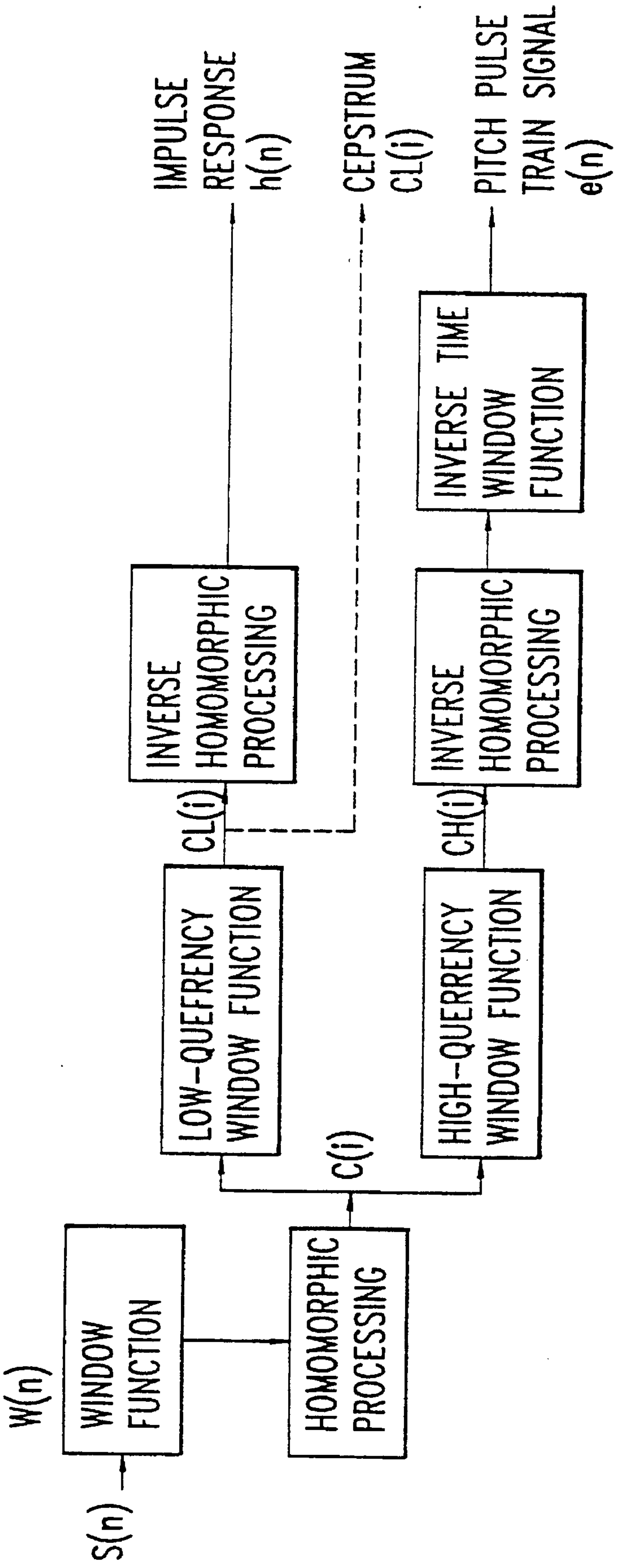

A spiky waveform is a waveform that has a nearly flat spectral envelope in the frequency domain. When a voiced speech waveform s(n) is given, a periodic pitch pulse train signal e(n) having a flat spectral envelope as shown in FIG. 3F can be obtained as output by estimating the envelope of the spectrum S(f) of the waveform s(n) and inputing it into an inverse spectral envelope filter 1/H(f) having an inverse of the envelope function H(f) as a frequency characteristic. FIGS. 4, 5A and 5B are related to this step.

Because the pitch pulse waveforms of each period composing the periodic pitch pulse train signal e(n) as shown in FIG. 3F do not overlap with one another in the time domain, they can be separated. The principle of the periodic-waveform decomposition method is that because the separated "pitch pulse signals for one period" e1(n), e2(n), . . . have a substantially flat spectrum, if they are input back to the spectral envelope filter H(f) so that the signals have the original spectrum, then the wavelets s1(n), s2(n), etc. as shown in FIG. 3B can be obtained.

FIG. 4 is a block diagram of the periodic-waveform decomposition method of the present invention in which the voiced speech segment is analyzed into wavelets. The voiced speech waveform s(n) which is a digital signal, is obtained by band-limiting the analog voiced speech signal or musical instrumental sound signal with a low pass filter and by converting the resulting signals into analog-to-digital signals and storing on a magnetic disc in the form of the Pulse Code Modulation (PCM) code format by grouping several bits at a time, and is then retrieved to process when needed.

The first stage of wavelet preparation process according to the periodic-waveform decomposition method is a blind deconvolution in which the voiced speech waveform s(n) (periodic signal s(n)) is deconvolved into an impulse response h(n), which is a time domain function of the spectrum envelope function H(f) of the signal s(n), and a periodic pitch pulse train signal e(n) having a flat spectral envelope and the same period as the signal s(n). See FIGS. 5A and 5B and the discussion related thereto.

As described, for the blind deconvolution, the spectrum estimation technic with which the spectral envelope function H(f) is estimated from the signal s(n) is essential.

Prior art spectrum estimation technics can be classified into 3 methods:

1. A block analysis method;
2. A pitch-synchronous analysis method; and
3. A sequential analysis method depending on the length of an analysis interval.

The block analysis method is a method in which the speech signal is divided into blocks of constant duration of the order of 10–20 ms (milliseconds), and then the analysis is done with respect to the constant number of speech samples existing in each block, obtaining one set (commonly 10–16 parameters) of spectral envelope parameters for each block, for which method a homomorphic analysis method and a block linear prediction analysis method are typical.

The pitch-synchronous analysis method obtains one set of spectral envelope parameters for each period by performing analysis on each period speech signal which was obtained by dividing the speech signal with the pitch period as the unit (as shown in FIG. 3C), for which method the analysis-by-synthesis method and the pitch-synchronous linear prediction analysis method are typical.

In the sequential analysis method, one set of spectral envelope parameters is obtained for each speech sample (as shown in FIG. 3D by estimating the spectrum for each speech sample, for which method the least squares method and the recursive least squares method which are a kind of adaptive filtering method, are typical.

FIG. 3D shows variation with time of the first 4 reflection coefficients among 14 reflection coefficients k1, k2, . . . , k14 which constitute a spectral envelope parameter set obtained by the sequential analysis method. (Please refer to FIG. 5A.) As can be seen from the drawing, the values of the spectral envelope parameters change continuously due to continuous movement of the articulatory organs, which means that the impulse response h(n) of the spectral envelope filter continuously changes. Here, for convenience of explanation, assuming that h(n) does not change in an interval of one period, h(n) during the first, second and third period is denoted respectively as h(n)1, h(n)2, h(n)3 as shown in FIG. 3E.

A set of envelope parameters obtained by various spectrum estimation technics, such as a cepstrum CL(i) which is a parameter set obtained by the homomorphic analysis method, and a prediction coefficient set {ai} or a reflection coefficient set {ki}, or a set of line spectrum pairs, etc. which is obtained by applying the recursive least squares method or the linear prediction method, is equally dealt with as the H(f) or h(n), because it can make the frequency characteristic H(f) or the impulse response h(n) of the spectral envelope filter. Therefore, hereinafter, the impulse response is also referred to as the spectral envelope parameter set.

FIGS. 5A and 5B show methods of the blind deconvolution.

FIG. 5A shows a blind deconvolution method performed by using the linear prediction analysis method or by using the recursive least squares method which are both prior art methods. Given the voiced speech waveform s(n), as shown in FIG. 3C, the prediction coefficients (a1, a2, . . . , aN) or the reflection coefficients (k1, k2, . . . , kN) which are the spectral envelope parameters representing the frequency characteristic H(f) or the impulse response h(n) of the spectral envelope filter are obtained utilizing the linear prediction analysis method or the recursive least squares method. Normally 10–16 prediction coefficients are sufficient for the order of the prediction "N". Utilizing the prediction coefficients (a1, a2 . . . aN) and the reflection coefficients (k1, k2 . . . kN) as the spectral envelope parameter, an inverse spectral envelope filter (or simply referred to as an inverse filter) having the frequency characteristic of 1/H(f) which is an inverse of the frequency characteristic H(f) of the spectral envelope filter, can easily be constructed by one skilled in the art. If the voiced speech waveform is the input to the inverse spectral envelope filter, also referred to as a linear prediction error filter in the linear prediction analysis method or in the recursive least squares method, the periodic pitch pulse train signal of the type of FIG. 3F having the flat spectral envelope called as a prediction error signal or a residual signal can be obtained as output from the filter.

Figure 5C:
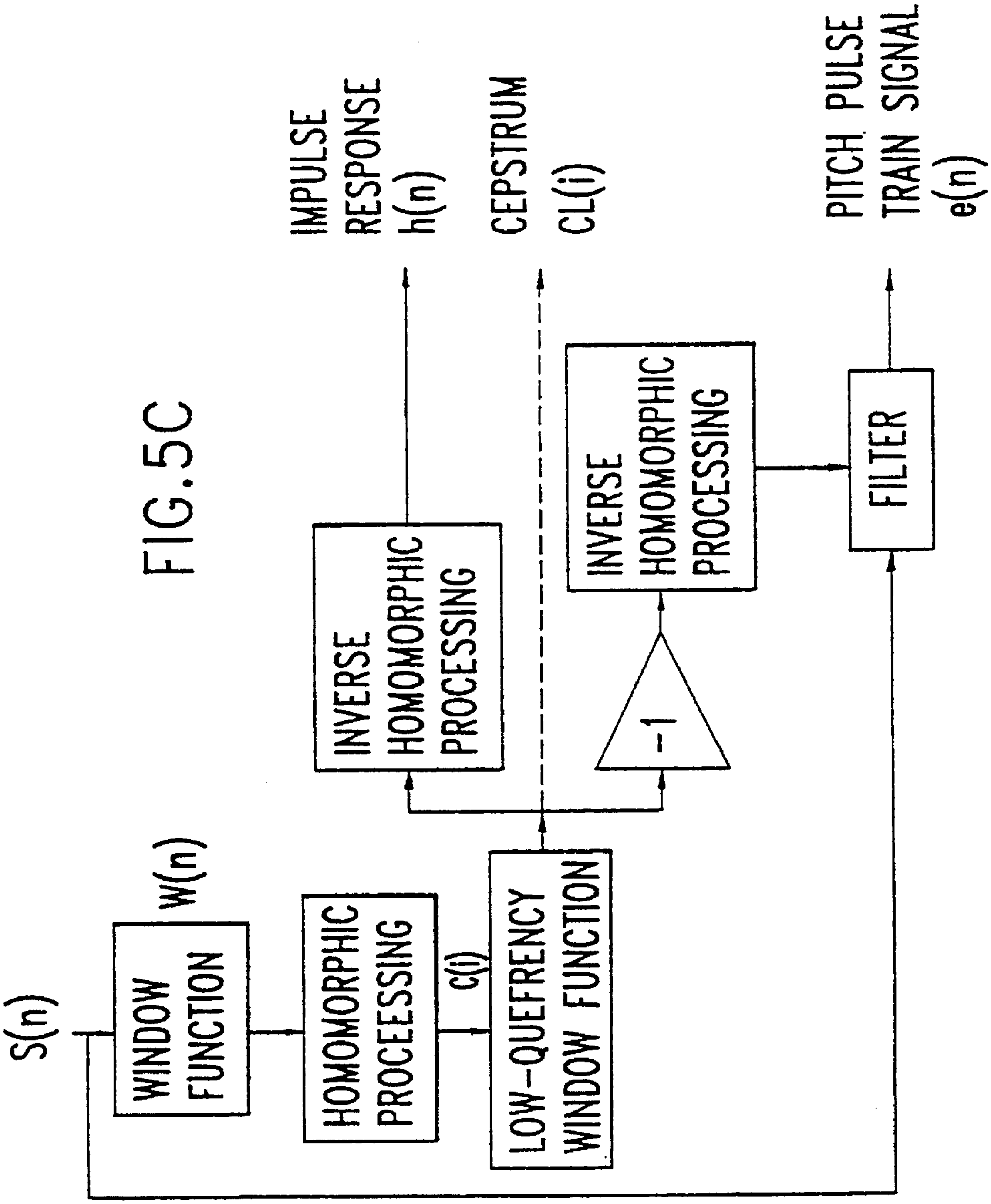
Figure 5D:
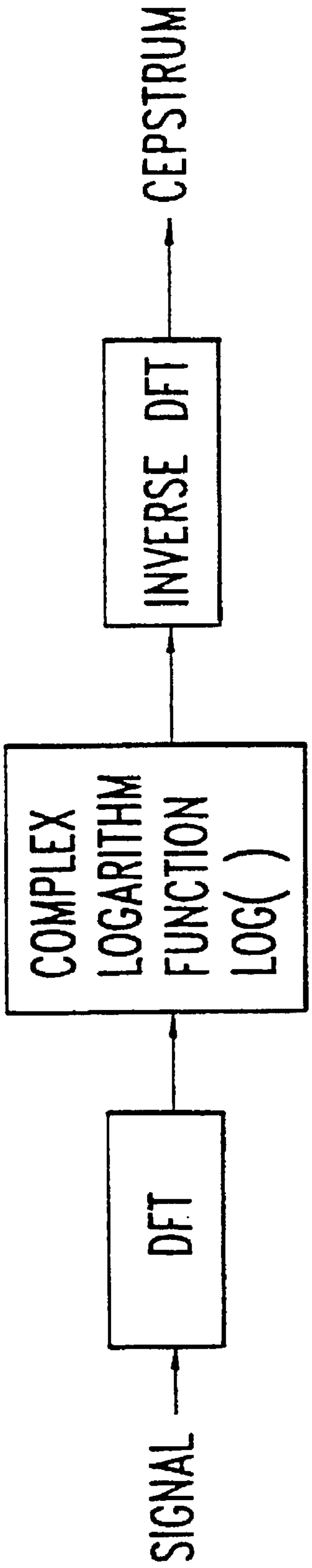

FIGS. 5B and 5C show the blind deconvolution method utilizing the homomorphic analysis method, which is a block analysis method, while FIG. 5B shows the method performed by a frequency division (NOT heretofore DEFINED or discussed relative to this—explain or delete) and FIG. 5C shows the method performed by inverse filtering respectively.

A description of FIG. 5B follows. Speech samples for analysis of one block are obtained by multiplying the voiced speech signal s(n) by a tapered window function such as Hamming window having a duration of about 10–20 ms. A cepstral sequence c(i) is then obtained by processing the speech samples utilizing a series of homomorphic processing procedures consisting of a discrete Fourier transform, a complex logarithm and an inverse discrete Fourier transform as shown in FIG., 5D. The cepstrum is a function of the quefrency which is a unit similar to time.

Figure 5E:
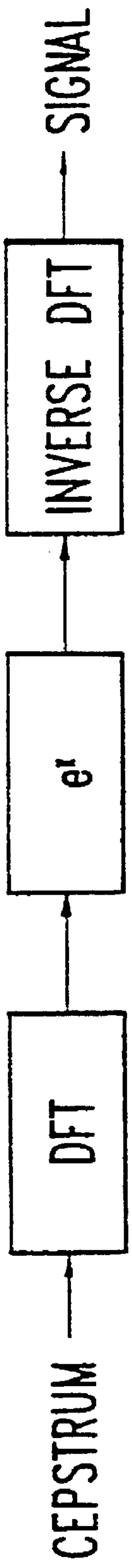

A low-quefrency cepstrum CL(i) situated around an origin representing the spectral envelope of the voiced speech s(n) and a high-quefrency cepstrum CH(i) representing a periodic pitch pulse train signal e(n), are capable of being separated from each other in quefrency domain. That is, multiplying the cepstrum c(i) by a low-quefrency window function and a high-quefrency window function, respectively, gives CL(i) and CH(i), respectively. Taking them respectively through an inverse homomorphic processing procedure as shown in FIG. 5E gives the impulse response h(n) and the pitch pulse train signal e(n). In this case, because taking the CH(i) through the inverse homomorphic processing procedure does not directly give the pitch pulse train signal e(n) but gives the pitch pulse train signal of one block multiplied by a time window function w(n), e(n) can be obtained by multiplying again the pitch pulse train signal by an inverse time window function 1/w(n) corresponding to the inverse of w(n).

The method of FIG. 5C is the same as that of FIG. 5B, except only that CL(i) instead of CH(i) is utilized in FIG. 5C in obtaining the periodic pitch pulse train signal e(n). That is, in this method, by utilizing the property that an impulse response $h^{-1}$ (n) corresponding to 1/H(f) which is an inverse of the frequency characteristics H(f) can be obtained by processing –CL(i), which is obtained by taking the negative of CL(i), through the inverse homomorphic processing procedure, the periodic pitch pulse train signal e(n) can be obtained as output by constructing a finite-duration impulse response (FIR) filter which has $h^{-1}$ (n) as an impulse response and by inputting to the filter an original speech signal s(n) which is not multiplied by a window function. This method is an inverse filtering method which is basically the same as that of FIG. 5A, except only that while in the homomorphic analysis of FIG. 5C the inverse spectral envelope filter 1/H(f) is constructed by obtaining an impulse response $h^{-1}$ (n) of the inverse spectral envelope filter, in FIG. 5A the inverse spectral envelope filter 1/H(f) can be directly constructed by the prediction coefficients {ai} or the reflection coefficients {ki} obtained by the linear prediction analysis method.

In the blind deconvolution based on the homomorphic analysis, the impulse response h(n) or the low-quefrency cepstrum CL(i) shown by dotted lines in FIGS. 5B and 5C can be used as the spectral envelope parameter set. When using the impulse response {h(o), h(1), . . . . , h(N–1)} a spectral envelope parameter set is normally comprised of a good number of parameters of the order of N being 90–120, whereas the number of parameters can be decreased to 50–60 with N being 25–30 when using the cepstrum {CL(–N)m CL(–N+1), . . . , O, . . . , CL(N)}.

As described above, the voiced speech waveform s(n) is deconvolved into the impulse response h(n) of the spectral envelope filter and the periodic pitch pulse train signal e(n) according to the procedure of FIG. 5.

If once the pitch pulse train signal and the spectral envelope parameters have been obtained according to the blind deconvolution procedure, then pitch pulse positions P1, P2, etc. are obtained from the periodic pitch pulse train signal e(n) or the speech signal s(n) by utilizing a pitch pulse position detection algorithm in the time domain such as the epoch detection algorithm. Next, the pitch pulse signals e1(n), e2(n) and e3(n) shown in FIGS. 3H, 3K, 3N respectively are obtained by periodically segmenting the pitch pulse train signal e(n) so that one pitch pulse is included in one period interval as shown in FIG. 3F. The positions of the segmentation can be decided as center points between the pitch pulses or points which are a constant time ahead of each pitch pulse. However, because the position of each pitch pulse in view of time coincides with the end portion of each glottal pulse, as fully appreciated by comparing Figs. 3A and 3F, it is preferable to select a point a constant time behind each pitch pulse as the position of the segmentation as indicated by the dotted line in FIG. 3F. However, because the pitch pulse presents the biggest effect to the audibility, there are no significant differences in the synthesized speech between the cases.

Figures 3G, 3H, 3I, 3J, 3K, 3L:
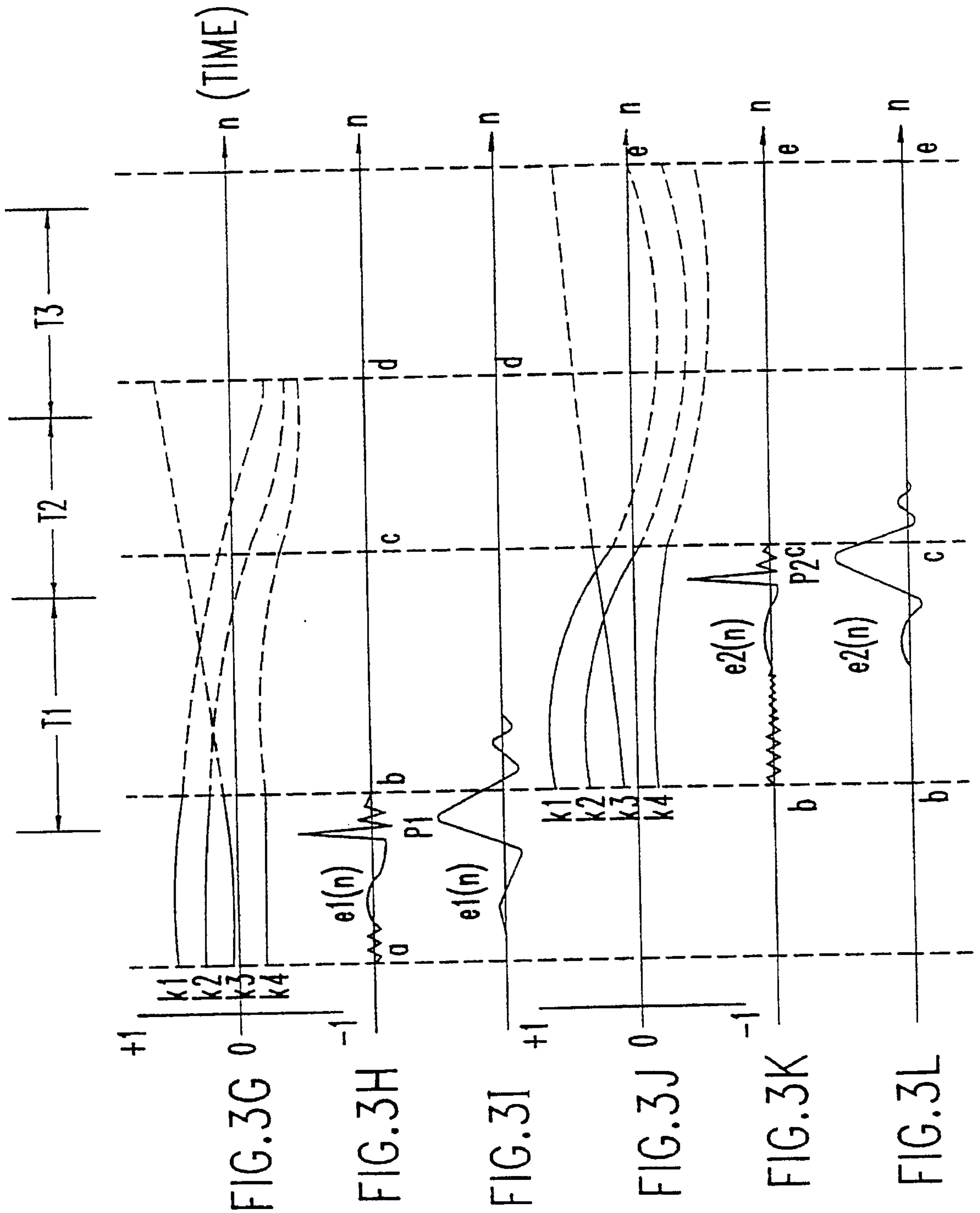

If the pitch pulse signals e1(n), e2(n), e3(n), etc. obtained by this method are respectively convolved again with the h1(n), h2(n), h3(n) of FIG. 3E which are impulse responses during the period interval of the pitch pulse signals e1(n), e2(n), e3(n), etc., the intended wavelets such as shown in FIG. 3I, 3L, 3(0) are obtained. Such convolution can be conveniently performed by inputting each pitch pulse train signal to the spectral envelope filter H(f) which utilizes the spectrum envelope parameters as the filter coefficients as shown in FIG. 4. For example, in cases where the linear prediction coefficients or the reflection coefficients or the line spectrum pairs are used as the spectral envelope parameters as in the linear prediction analysis method, an IIR (infinite-duration impulse response) filter having the linear prediction coefficients or the reflection coefficients or the line spectral pairs as the filter coefficients is composed. In cases where the impulse response is used for the spectral envelope parameters as in the homomorphic analysis method, an FIR filter having the impulse response as the tap coefficients is composed. Since the synthesis filter cannot directly be composed if the spectral envelope parameter is a logarithmic area ratios or the cepstrum, the spectral envelope parameters should be transformed back into the reflection coefficients or the impulse response to be used as the coefficients of the IIR or FIR filter. If the pitch pulse signal for one period is the input to the spectral envelope filter composed as described above with the filter coefficients changed with time in accordance with the spectral envelope parameters corresponding to the same instant as each sample of the pitch pulse signal, then the wavelet for that period is output.

For that reason, the "time function waveforms" of the spectral envelope parameters are cut out at the same point as when e(n) was cut out to obtain the pitch pulse signal for each period. For example, in the sequential analysis case, the first-period spectral envelope parameters k1(n)1, k2(n)1, etc. as shown in FIG. 3G are obtained by cutting out the spectral envelope parameters corresponding to the same time period as the first period pitch pulse signal e1(n) shown in FIG. 3H from the time functions k1(n), k2(n), etc. of the spectral envelope parameters as shown in FIG. 3D. The second and third period spectral envelope parameters indicated as a solid line in FIG. 3J and FIG. 3M can also be obtained in a similar way mentioned above. In FIG. 4, the reflection coefficients k1, k2, . . . , kN and the impulse response h(O), h(1), . . . , h(N–1) are shown as a typical spectral envelope parameter set, where they were denoted as k1(n), k2(n), . . . , kn(n) and h(O,n), h(1, n), . . . , h(N–1, n) to emphasize that they are functions of time. Likewise, in cases where the cepstrum CL(i) is used as the spectral envelope parameter set, it will be denoted as CL(i, n).

Because unlike the sequential analysis method, the time functions of the spectral envelope parameters are not obtained in the case of the pitch-synchronous analysis method or the block analysis method, but the spectral envelope parameter values which are constant over the analysis interval are obtained, it should be necessary to make the time functions of the spectral envelope parameters from the spectral envelope parameter values and then segment the time functions period by period to obtain the spectral envelope parameters for one period. However, in reality, it is convenient to process as follows instead of composing the time functions. That is, in the case of the pitch-synchronous analysis method, since a set of spectral envelope parameters having constant values corresponds to each pitch period interval as shown as a dashed line in FIG. 8B, the spectral envelope parameters show no change even when their time functions are segmented period by period. Therefore, the spectral envelope parameters for one period to be stored in a buffer are not time functions but constants independent of time.

In case of the block analysis method, since a set of constant spectral envelope parameters per block is obtained, the values of a spectral envelope parameter for one period belonging to one block, for example, k1(n)1, k1(n)2, . . . , k1(n)M are not only constantly independent of time but also identical. (Here, the k1(n)j means the time function of k1 for the j-th period interval, and M represents the number of pitch period intervals belonging to a block.)

It should be noted in the case of the block analysis method that when the pitch pulse signal lies across the boundary of two adjacent blocks, the spectral envelope parameter values of the preceding block and following block shall be used respectively for the proceeding and following signal portions divided with respect to the block boundary.

As can be seen in FIG. 3I, the duration of the wavelet is not necessarily equal to one period. Therefore, before applying the pitch pulse signal and the spectral envelope parameters of one period length obtained by the periodic segmentation to the spectral envelope filter, the processes of zero appending and parameter trailing shown in FIG. 4 are needed for the duration of the pitch pulse signal and the spectral envelope parameters to be at least as long as that of the effective duration of the wavelet. The process of zero appending is to make the total duration of the pitch pulse signal as long as the required length by appending the samples having the value of zero after the pitch pulse signal of one period. The process of parameter trailing is to make the total duration of the spectral envelope parameter as long as the required length by appending the spectral envelope parameter for the following periods after the spectral envelope parameter of one period length. However, even if a simple method of repeatedly appending the final value of the spectral envelope parameter of a period or the first value of the spectral envelope parameter of the next period, the quality of the synthesized speech is not degraded significantly.

The fact that the effective duration of the wavelet to be generated by the spectral envelope filter depends on the values of the spectral envelope parameters makes it difficult to estimate it in advance. However, because it does not give significant errors for practical use in most cases if it is regarded that the effective duration of the wavelet is 2 periods from the pitch pulse position in the case of male speech and 3 periods from the pitch pulse position in the case of female or children's speech, it is convenient to decide that the duration of "the trailed pitch pulse signal" to be made by zero appending and "the trailed spectral envelope parameters" to be made by parameter trailing became 3 and 4 period lengths for male and female speech respectively in the case that periodic segmentation is done right after the pitch pulses. In FIG. 3G, trailed spectral envelope parameters for the first period of the 3 period interval "ad" made by appending the spectral envelope parameters for the 2 period interval "bd" indicated by a dotted line next to the spectral envelope parameter of the first period interval "ab" obtained by the periodic segmentation is shown as an example. In FIG. 3H, a trailed pitch pulse signal for the first period of the 3 period interval "ad" made by appending the zero-valued samples to the 2 period interval "bd" next to the pitch pulse signal of the first period interval "ab" obtained by the periodic segmentation is shown as an example.

In the case as described above, because the duration after the zero appending and the parameter trailing is increased to 3 or 4 periods while the duration of the pitch pulse signal and the spectral envelope parameter prior to the zero appending and the parameter trailing is one period, buffers are provided between the periodic segmentation and the parameter trailing, as shown in FIG. 4, and the pitch pulse signal and the spectral envelope parameters obtained by the periodic segmentation are then stored in the buffers and are retrieved when required, so that a temporal buffering is accomplished.

If the trailed pitch pulse signal and the trailed spectral envelope parameters are obtained by the zero appending and the parameter trailing in FIG. 4, the "wavelet signal" s1(n) for the first period of the length of the 3 period interval such as the interval "ad" as shown in FIG. 3I can finally be obtained by inputting the trailed pitch pulse signal of the first period such as the interval "ad" of FIG. 3H to the spectral envelope filter H(f) and synchronously varying the coefficients in the same way as the trailed spectral envelope parameter of the first period such as the interval "ad" of FIG. 3G. The wavelet signal s2(n) and s3(n) for the second and third period respectively can be likewise obtained.

Figures 3M, 3N, 3O:
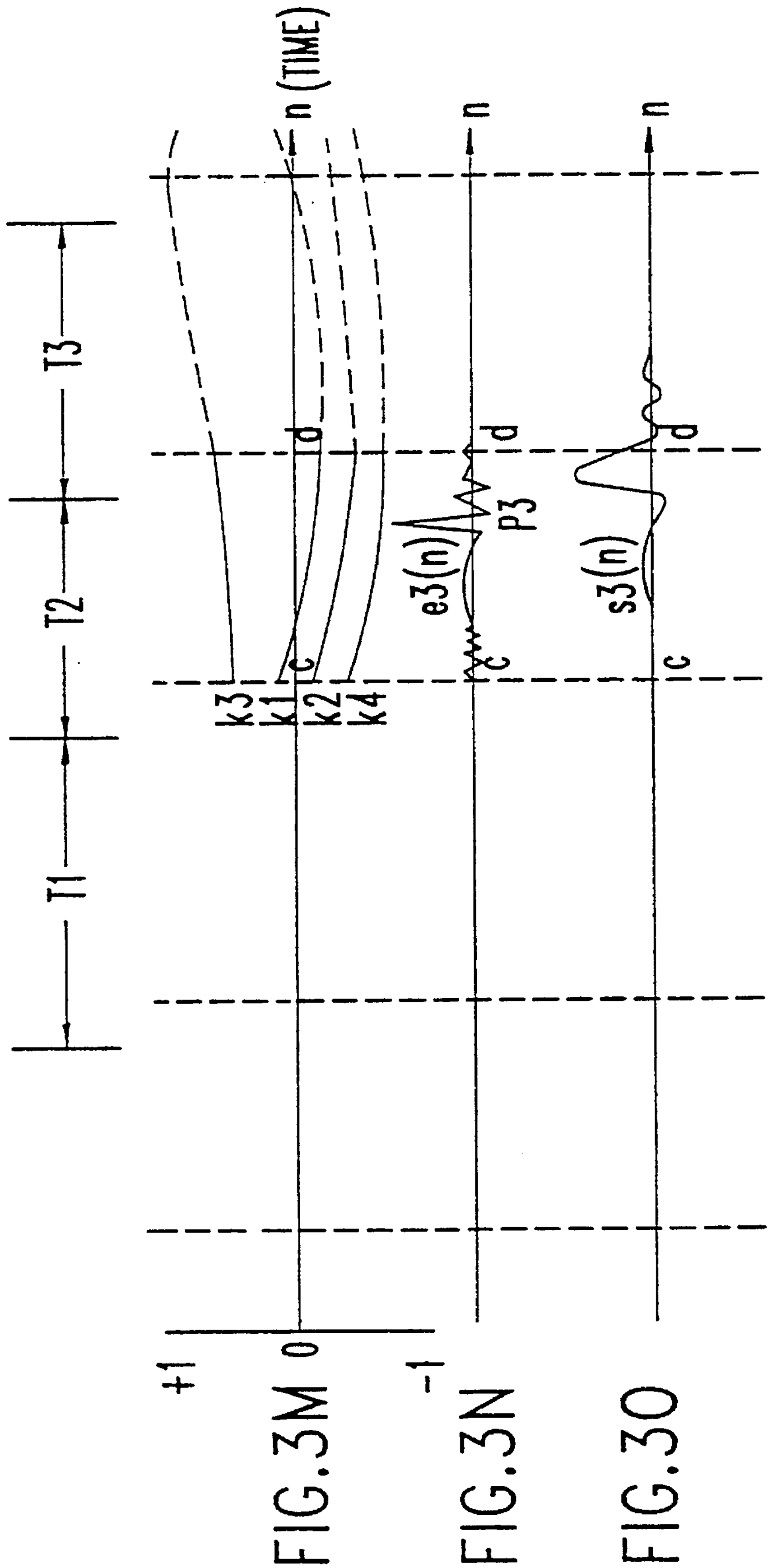
Figures 3P, 3Q, 3R, 3S, 3T:
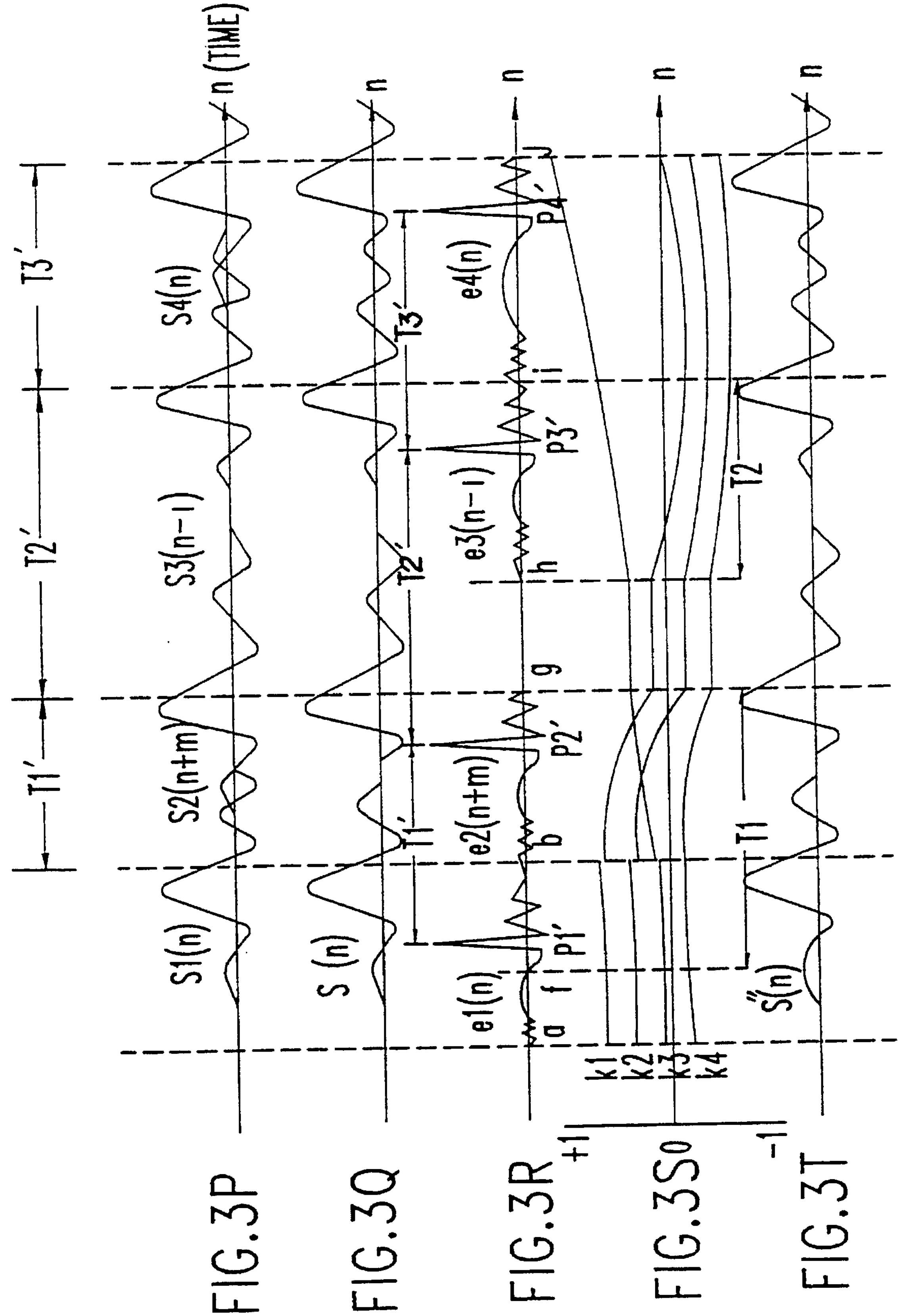

As described above, the voiced speech waveform s(n) is finally decomposed into the wavelets composing the waveform s(n) by the procedure of FIG. 4. Obviously, rearranging the wavelets of FIG. 3I, FIG. 3L and FIG. 3(O) obtained by decomposition back to the original points yields FIG. 3B and if the wavelets are superposed, the original speech waveform s(n) as shown in FIG. 3C is obtained again. If the wavelets of FIG. 3I, FIG. 3L and FIG. 3(O) are rearranged by varying the interspaces and are then superposed as shown in FIG. 3P, the speech wavelet having a different pitch pattern as shown in FIG. 3Q is obtained. As such, varying properly the time interval between the wavelets obtained by decomposition enables the synthesis of speech having the arbitrary desired pitch pattern, i.e. the intonation. Similarly, varying properly the energy of the wavelets enables the synthesis of speech having the arbitrary desired stress pattern.

Figure 6A:
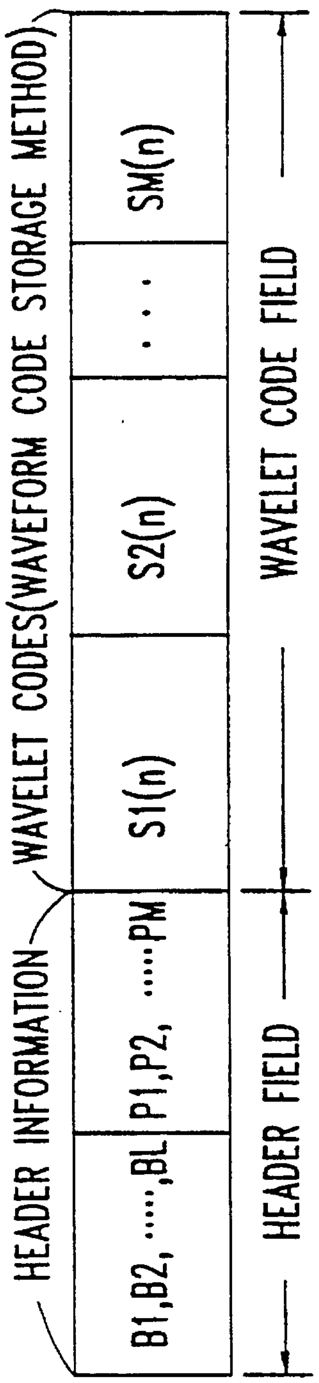
FIGS. 6A and 6B illustrate code formats for the voiced speech segment information stored at the speech segment storage block.

In the speech segment storage block shown in FIG. 2, each voiced speech segment decomposed into as many wavelets as the number of pitch pulses according to the method shown in FIG. 4 is stored in the format as shown in FIG. 6A, which is referred to as the speech segment information. In a header field which is a fore part of the speech segment information, boundary time points B1, B2, . . . , BL which are important time points in the speech segment and pitch pulse positions P1, P2, . . . , PM of each pitch pulse signal used in synthesis of each wavelet is stored, in which the number of samples corresponding to each time point is recorded taking the first sample position of the first pitch pulse signal e1(n) as 0. The boundary time point is the time position of the boundary points between the subsegments resulting when the speech segment is segmented into several subsegments. For example, the vowel having consonants before and after it can be regarded as consisting of 3 subsegments for the slow speed speech because the vowel can be divided into a steady-state interval of the middle part and two transitional intervals present before and after the steady-state interval, and 3 end points of the subsegments are stored as the boundary time points in the header field of the speech segment. However, in the case where the sampling is done at faster speech rate, because the transitional interval becomes one point, so that the speech segment of the vowel can be regarded as consisting of 2 subsegments, two boundary time points are stored in the header information.

In the wavelet code field, which is the latter part of the speech segment information, wavelet codes, which are codes obtained by waveform-coding the wavelet corresponding to each period, are stored. The wavelets may be coded by the simple waveform coding method, such as PCM, but because the wavelets have significant short-term and long-term correlation, the amount of memory necessary for storage can be significantly decreased if the wavelets are efficiently waveform-coded by utilizing the ADPCM having a pitch-predictive loop, an adaptive predictive coding or an digital adaptive delta modulation method. The method, in which the wavelets obtained by decomposition are waveform-coded, with the resulting codes being stored and, at the time of synthesis, the codes are decoded, rearranged and superposed to produce synthesized speech, is called the "waveform code storage method".

The pitch pulse signal and the corresponding spectral envelope parameters can be regarded as identical to the wavelet because they are materials with which the wavelet can be made. Therefore, the method is also possible in which the "source codes" obtained by coding the pitch pulse signals and the spectral envelope parameters are stored and the wavelets are made with the pitch pulse signals and the spectral envelope parameters obtained by decoding the source codes and the wavelets are then rearranged and superposed to produce the synthesized speech. This method is called the "source code storage method". This method corresponds to the one in which the pitch pulse signal and the spectral envelope parameters stored in the buffers, instead of the wavelets obtained as the output in FIG. 4, are mated with each other in the same period interval and then stored in the speech segment storage block. Therefore, in the source code storage method, the procedures after the buffer in FIG. 4, that is, the parameter trailing procedure, the zero appending procedure and the filtering procedure by the synthesis filter H(f) are performed in the waveform assembly subblock in FIG. 7.

Figure 6B:
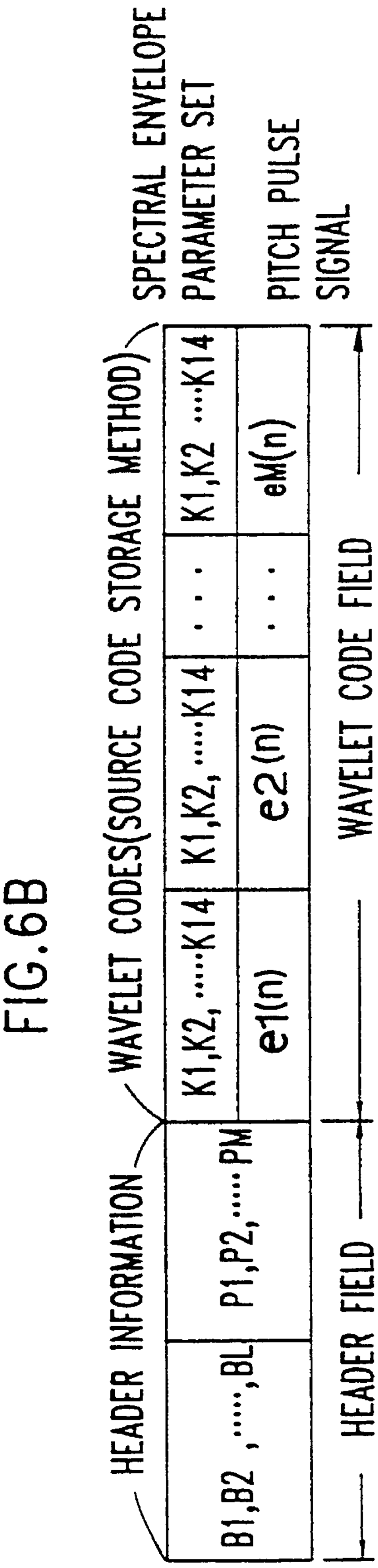

In the source code storage method, the format of the speech segment information is as shown in FIG. 6B, which is the same as FIG. 6A except for the content of the wavelet code field. That is, the pitch pulse signals and the spectral envelope parameters necessary for the synthesis of the wavelets instead of the wavelets are coded and stored at the positions where the wavelet for each period is to be stored in FIG. 6A.

The spectral envelope parameters are coded according to the prior art quantization method of the spectral envelope parameters and stored at the wavelet code field. At that time, if the spectral envelope parameters are appropriately transformed before quantization, the coding can be efficiently performed. For example, it is preferable to transform the prediction coefficients into the parameters of the line spectrum pair and the reflection coefficients into the log area ratios and to quantize them. Furthermore, since the impulse response has close correlation between adjacent samples and between adjacent impulse responses, if they are waveform-coded according to a differential coding method, the amount of data necessary for storage can be significantly reduced. In case of the cepstrum parameters, a coding method is known in which the cepstrum parameter is transformed so that the amount of data can be significantly reduced.

On the one hand, the pitch pulse signal is coded according to an appropriate waveform-coding method and the resulting code is stored at the wavelet code field. The pitch pulse signals have little short-term correlation but have significant long-term correlation with each other. Therefore, if the waveform-coding method such as the pitch-predictive adaptive PCM coding which has the pitch-predictive loop is used, high quality synthesized speech can be obtained even when the amount of memory necessary for storage is reduced to 3 bits per sample. The prediction coefficient of a pitch predictor may be a value obtained for each pitch period according to an auto-correlation method or may be a constant value. At the first stage of the coding, the pitch-prediction effect can be increased through a normalization by dividing the pitch pulse signal to be coded by the square root of the average energy per sample "G". The decoding is performed in the voiced speech synthesis block, and the pitch pulse signal is restored to its original magnitude by multiplying by "G" again at the end stage of the decoding.

In FIG. 6B, the speech segment information is shown for the case that a linear predictive analysis method is adopted which uses 14 eflection coefficients as the spectral envelope parameters. If the analysis interval for the linear predictive analysis is the pitch period, 14 reflection coefficients correspond to each pitch pulse signal and are stored. If the analysis interval is a block of certain length, the reflection coefficients for several pitch pulses in one block have the same values so that the amount of memory necessary for the storage of the wavelets is reduced. In this case, as discussed above, since the reflection coefficients of the fore block or the latter block are used at the time of synthesis for the pitch pulse signal lying across the boundary of two blocks, depending on whether the samples of the signal are before or after the boundary point, the position of the boundary point between blocks must be additionally stored in the header field. If the sequential analysis method such as the recursive least squares method is used, the reflection coefficients k1, k2, . . . , k14 become continuous functions of time index "n" as shown in FIG. 3D, and a lot of memory is required to store the time function k1(n), k2(n), . . . , k14(n). Taking the case of FIG. 3 as an example, the waveforms for the interval "ab" of FIG. 3G and FIG. 3H as the first period and for the interval "bc" of FIG. 3J and FIG. 3K as the second period and for the interval "cd" of FIG. 3M and FIG. 3N as the third period of the wavelet code field are stored in the wavelet code field.

The waveform code storage method and the source code storage method are essentially the same method, and in fact, the waveform code obtained when the wavelets are coded according to the efficient waveform coding method such as the APC (Adaptive Predictive Coding) in the waveform code storage method become almost the same as the source code obtained in the source code storage method in their contents. The waveform code in the waveform code storage method and the source code in the source code storage method are in total called the wavelet code.

Figure 7:
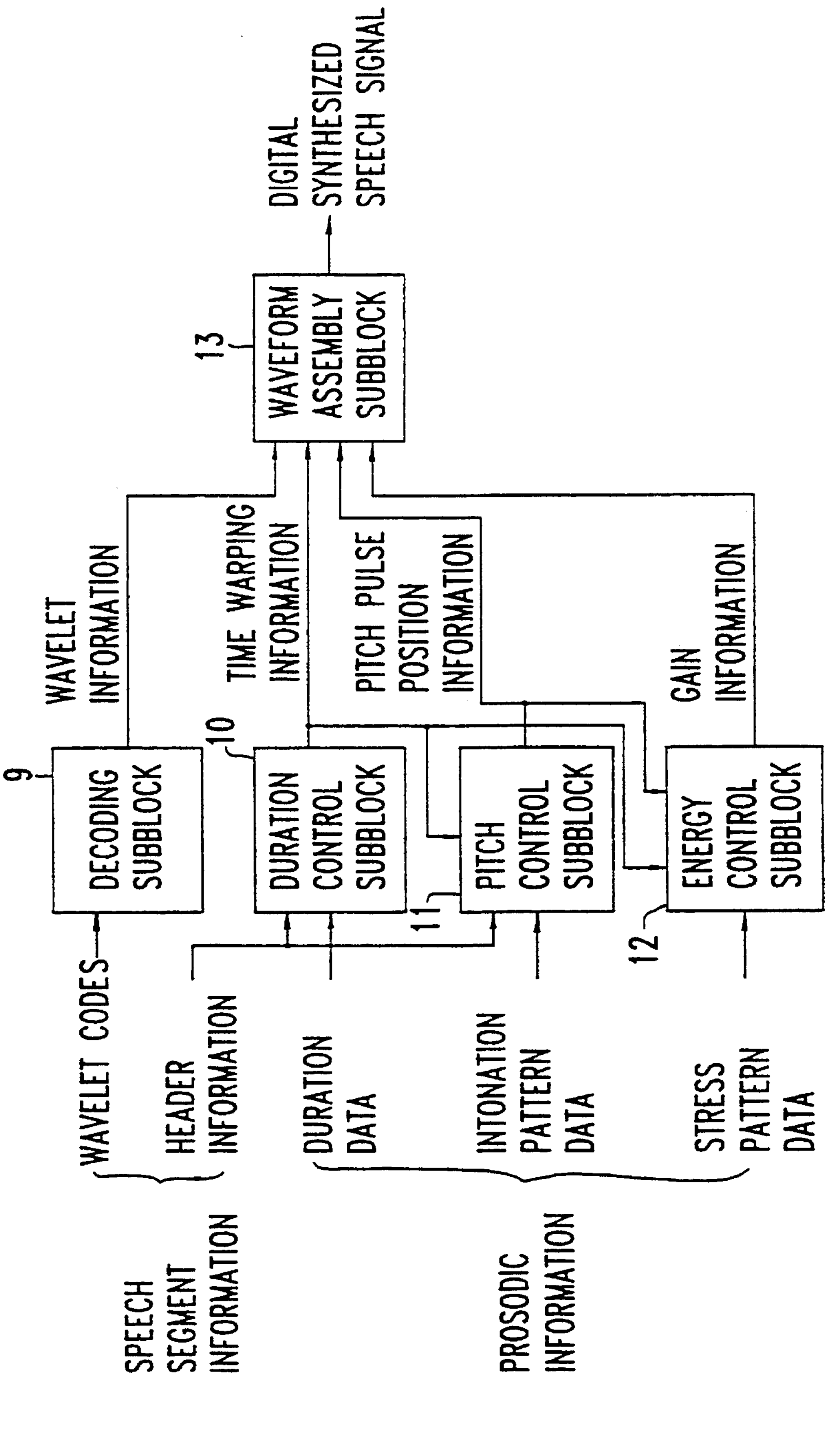
FIG. 7 illustrates the voiced speech synthesis block according to the present invention.

FIG. 7 illustrates the inner configuration of the voiced speech synthesis block of the present invention. The wavelet codes stored in the wavelet code field of the speech segment information received from the speech segment storage block are decoded in the procedure reversed from the procedure in which they were coded by a decoding subblock 9. The wavelet signals obtained when the waveform codes are decoded in the waveform code storage method, or the pitch pulse signals obtained when the source codes are decoded in the source code storage method and the spectral envelope parameters mated with the pitch pulse signals are called the wavelet information, and are provided to the waveform assembly subblock. On the one hand, the header information stored in the header field of the speech segment information is the input to a duration control subblock 10 and a pitch control subblock 11.

The duration control subblock of FIG. 7 receives as input the duration data in the prosodic information and the boundary time points included in the speech segment header information, and produces the time warping information by utilizing the duration data and the boundary time points and provides the produced time warping information to the waveform assembly subblock 13, the pitch control subblock and the energy control subblock. If the total duration of the speech segment becomes longer or shorter, the duration of subsegments constituting the speech segment becomes longer or shorter accordingly, where the ratio of the expansion or the compression depends on the property of each subsegment. For example, in case of the vowel having consonants before and after it, the duration of the steady state interval which is in the middle has substantially larger variation rate than those of the transition intervals on both sides of the vowel. The duration control subblock compares the duration BL of the original speech segment which have been stored and the duration of the speech segment to be synthesized indicated by the duration data and obtains the duration of each subsegment to be synthesized corresponding to the duration of each original subsegment by utilizing their variation rate or the duration rule, thereby obtaining the boundary time points of the synthesized speech. The original boundary time points B1, B2, etc. and the boundary time points B'1, B'2, etc. of the synthetic speech mated in correspondence to the original boundary time points are in total called the time warping information, upon which in case of FIG. 8, for example, the time warping information can be presented by ((B1, B'1), (B1, B'2), (B2, B'3), (B3, B'3), (B4, B'4)).

The function of the pitch control subblock of FIG. 7 is to produce the pitch pulse position information such that the synthetic speech has the intonation pattern indicated by the intonation pattern data, and provide it to the waveform assembly subblock and the energy control subblock. The pitch control subblock receives as input the intonation pattern data which is the target pitch frequency values for each phoneme, and produces a pitch contour representing the continuous variation of the pitch frequency with respect to time by connecting the target pitch frequency values smoothly. The pitch control subblock can reflect a microintonation phenomenon due to an obstruent to the pitch contour. However, in this case, the pitch contour becomes a discontinuous function in which the pitch frequency value abruptly varies with respect to time at the boundary point between the obstruent phoneme and the adjacent other phoneme. The pitch frequency is obtained by sampling the pitch contour at the first pitch pulse position of the speech segment, and the pitch period is obtained by taking an inverse of the pitch frequency, and then the point proceeded by the pitch period is determined as the second pitch pulse position. The next pitch period is then obtained from the pitch frequency at that point and the next pitch pulse position is obtained in turn, and the repetition of such procedure could yield all the pitch pulse positions of the synthesized speech. The first pitch pulse position of the speech segment may be decided as the first sample or its neighboring samples in case of the first speech segment of a series of the continuous voiced speech segments of the synthesized speech, and the first pitch pulse position for the next speech segment is decided as the point corresponding to the position of the pitch pulse next to the last pitch pulse of the preceding speech segment, and so on. The pitch control subblock sends the pitch pulse positions P'1, P'2, etc. of the synthetic speech obtained as such and the original pitch pulse positions P1, P2, etc. included in the speech segment header information together in a bind to the waveform assembly subblock and the energy control subblock where they are so called the pitch pulse position information. In case of FIG. 8, for example, the pitch pulse position information can be represented as {(P1, P2, . . . P9), (P'1, P'2, . . . , P'8)}.

The energy control subblock of FIG. 7 produces gain information by which the synthesized speech has the stress pattern as indicated by the stress pattern data, and sends it to the waveform assembly subblock. The energy control subblock receives as input the stress pattern data which are the target amplitude values for each phoneme, and produces an energy contour representing the continuous variation of the amplitude with respect to time by connecting them smoothly. It is assumed that the speech segments are normalized in advance at the time of storage so that they have relative energy according to the class of the speech segment to reflect the relative difference of energy for each phoneme. For example, in case of the vowels, a low vowel has larger energy per unit time than a high vowel, and a nasal sound has about half the energy per unit time compared to the vowel. Furthermore, the energy during the closure interval of the plosive sound is very weak. Therefore, when the speech segments are stored they shall be coded after adjusting in advance so that they have such relative energy. In this case, the energy contour produced in the energy control subblock becomes a gain to be multiplied to the waveform to be synthesized. The energy control subblock obtains the gain values G1, G2, etc. at each pitch pulse position P'1, P'2, etc. of the synthetic speech by utilizing the energy contour and the pitch pulse position information, and provides them to the waveform assembly subblock, these being called the gain information. In the case of FIG. 8, for example, the gain information can be represented as {(P'1, G1), (P'2, G2), . . . , (P'8, GS)}.

The waveform assembly subblock of FIG. 7 receives as input the above described wavelet information, time warping information, pitch pulse position information and gain information, and finally produces the voiced speech signal. The waveform assembly subblock produces the speech having the intonation pattern, stress pattern and duration as indicated by the prosodic information by utilizing the wavelet information received from the decoding subblock. At this time, some of the wavelets are repeated and some are omitted. The duration data, intonation pattern data and stress pattern data included in the prosodic information are indicative information independent of each other, whereas they have to be dealt with inter-linked because they have interrelation between these three information when the waveform is synthesized with the wavelet information. One of the most important problems in the waveform assembly is which wavelet to select as the wavelet to be arranged at each pitch pulse position of the synthesized speech. If the proper wavelets are not selected and arranged, good quality synthetic speech cannot be obtained. Below is given a description of the operation of the waveform assembly subblock utilizing the time warping based wavelet relocation method of the present invention which is a wavelet relocation method capable of obtaining high quality in synthesizing the synthetic speech by utilizing the speech segment information received from the speech segment storage block.

The voiced speech waveform synthesis procedure of the waveform assembly subblock consists of two stages, that is, the wavelet relocation stage utilizing the time warping function and the superposition stage for superposing the relocated wavelets.

That is, in the case of the waveform code storage method, the best suited ones are selected for the pitch pulse positions of the synthetic speech among the wavelet signals received as the wavelet information and are located at their pitch pulse positions, and their gains are adjusted, and thereafter the synthesized speech is produced by superposing them.

In the source code storage method, the pitch pulse signal and the spectral envelope parameters for each period corresponding to the pitch pulse signal are received as the wavelet information. In this case, two synthetic speech assembly methods are possible. The first method is to obtain each wavelet by imparting to the synthesis filter the spectral envelope parameters and the pitch pulse signal for 2–4 period interval length obtained by performing the procedures corresponding to the right-hand side of the buffer of FIG. 4, that is, the above described parameter trailing and the zero appending about the wavelet information, and then to assemble the synthetic speech with the wavelets according to the identical procedure to that in waveform code storage method. This method is basically the same as the assembly of the synthetic speech in the waveform code storage method, and therefore the separate description will be omitted. The second method is to obtain a synthetic pitch pulse train signal or synthetic excitation signal having a flat spectral envelope but having a pitch pattern different from that of the original periodic pitch pulse train signal by selecting the ones best suited to the pitch pulse positions of the synthetic speech among the pitch pulse signals and locating them and adjusting their gains, and thereafter superposing them, and to obtain synthetic spectral envelope parameters made by relating the spectral envelope parameter with each pitch pulse signal constituting the synthetic pitch pulse train signal or synthetic excitation signal, and then to produce the synthesized speech by imparting the synthetic excitation signal and the synthetic spectral envelope parameters to the synthesis filter. These two methods are essentially identical except that the sequence between the synthesis filter and the superposition procedure in the assembly of the synthesis speech is reversed.

Above described synthetic speech assembly method is described below with reference to FIG. 8. The wavelet relocation method can be basically equally applied both to the waveform code storage method and the source code storage method. Therefore the synthetic speech waveform assembly procedures in the two methods will be described simultaneously with reference to FIG. 8.

Figure 8A:
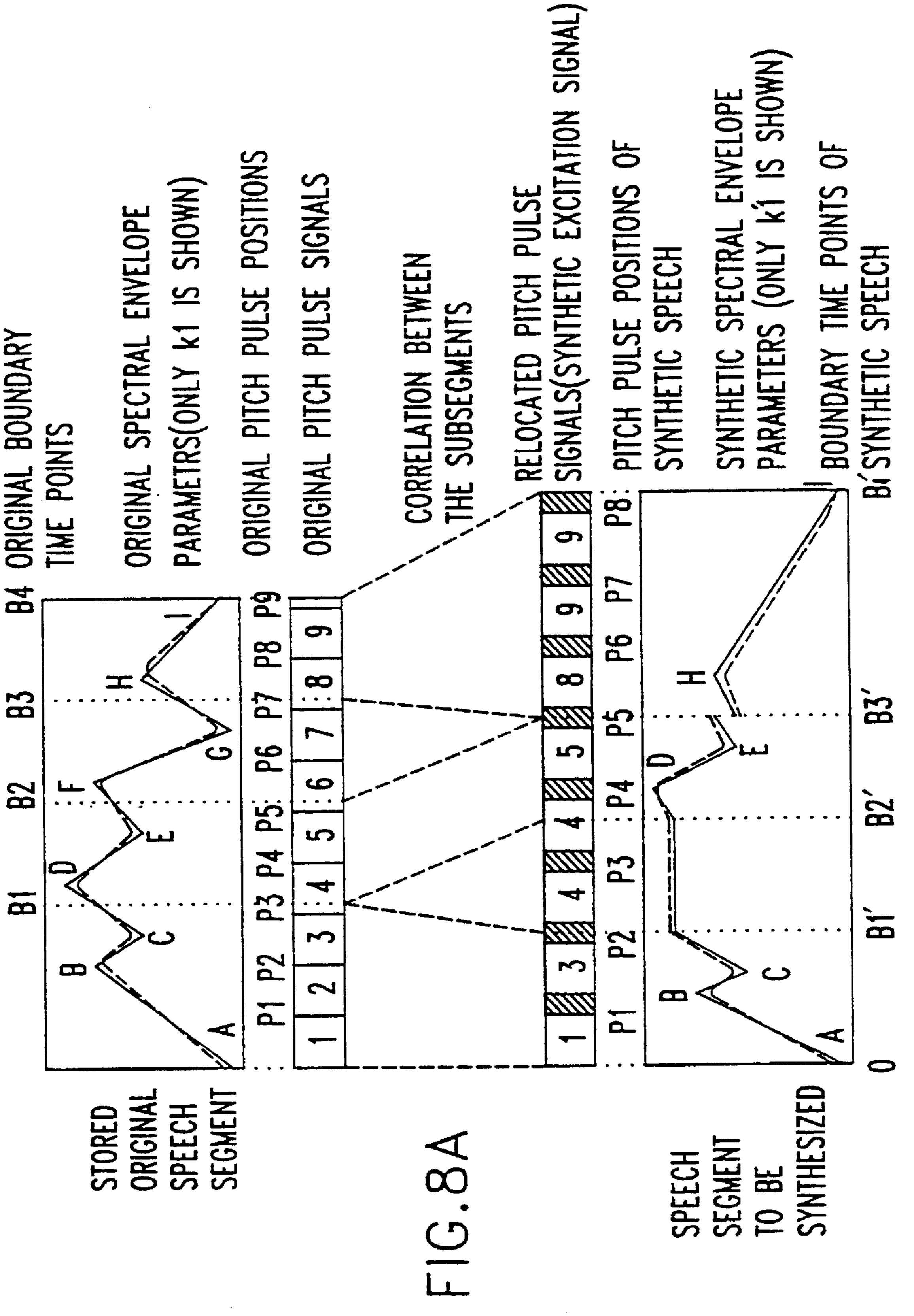
FIGS. 8A and 8B illustrate graphs for explaining the duration and pitch control method according to the present invention.

In FIG. 8A is illustrated the correlation between the original speech segment and the speech segment to be synthesized. The original boundary time points B1, B2, etc., indicated by dotted lines, the boundary time points B'1, B'2, etc. of the synthesized sound and the correlation between them indicated by the dashed lines are included in the time warping information received from the duration control subblock. In addition, the original pitch pulse positions P1 P2 etc indicated by the solid lines and the pitch pulse positions P'1, P'2, etc. of the synthesized sound are included in the pitch pulse position information received from the pitch control subblock. For convenience of the explanation in FIG. 8, it is assumed that the pitch period of the original speech and the pitch period of the synthesized sound are respectively constant and the latter is 1.5 times the former.

Figure 8B:
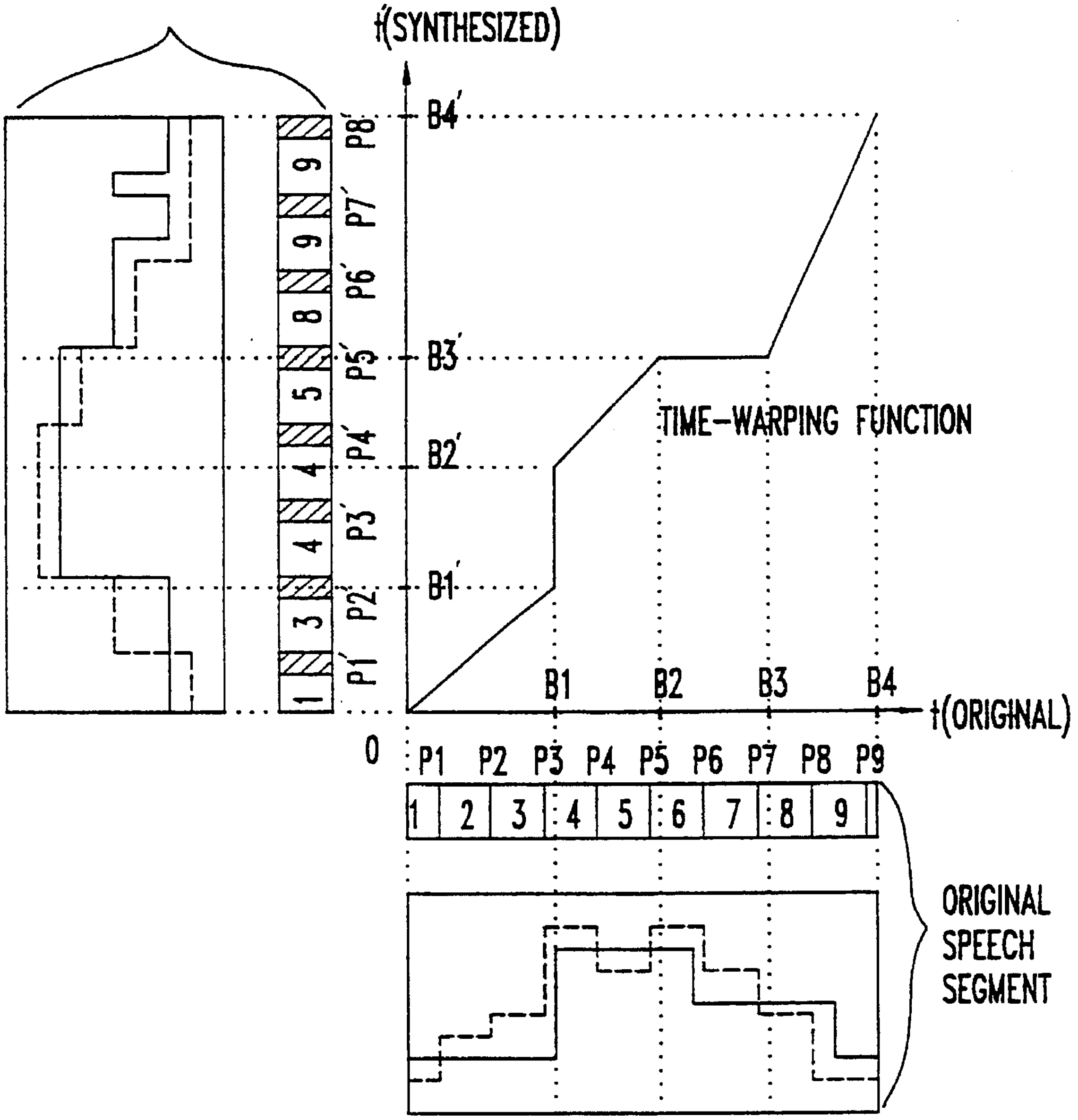

The waveform assembly subblock first forms the time warping function as shown in FIG. 8B by utilizing the original boundary time points, the boundary time points of the synthesized sound and the correlation between them. The abscissa of the time warping function represents the time "t" of the original speech segment, and the ordinate represents the time "t'" of the speech segment to be synthesized. In FIG. 8A, for example, because the first subsegment and the last subsegment of the original speech segment should be respectively compressed to ⅔ times and be expanded to 2 times, the correlation thereof appears as the lines of the slope of ⅔ and 2 in the time warping function of FIG. 8B, respectively. The second subsegment does not vary in its duration so as to appear as a line of slope of 1 in the time warping function. The second subsegment of the speech segment to be synthesized results from the repetition of the boundary time point "B1" of the original speech segment, and to the contrary, the third subsegment of the original speech segment varied to one boundary time point "B'3" in the speech segment to be synthesized. The correlations in such cases appears respectively as a vertical line and a horizontal line. The time warping function is thus obtained by presenting the boundary time point of the original speech segment and the boundary time point of the speech segment to be synthesized corresponding to the boundary time point of the original speech segment as two points and by connecting them with a line. It may be possible in some cases to present the correlation between the subsegments to be more close to reality by connecting the points with a smooth curve.

In the waveform code storage method, the waveform assembly subblock finds out the original time point corresponding to the pitch pulse position of the synthetic sound by utilizing the time warping function, and finds out the wavelet having the pitch pulse position nearest to the original time point, then locates the wavelet at the pitch pulse position of the synthetic sound.

In the next stage, the waveform assembly subblock multiplies each located wavelet signal by the gain corresponding to the pitch pulse position of the wavelet signal found out from the gain information, and finally obtains the desired synthetic sound by superposing the gain-adjusted wavelet signals simply by adding them. In FIG. 3Q is illustrated the synthetic sound produced by such a superposition procedure for the case where the wavelets of FIG. 3I, FIG. 3L, FIG. 3(O) are relocated as in FIG. 3P.

Similarly, in the source code storage method, the waveform assembly subblock finds out the original time point corresponding to the pitch pulse position of the synthetic sound by utilizing the time warping function, and finds out the pitch pulse signal having the pitch pulse position nearest to the original time point, and then locates the pitch pulse signal at the pitch pulse position of the synthetic sound.

The numbers for the pitch pulse signals or the wavelets located in this way at each pitch pulse position of the speech segment to be synthesized are shown in FIGS. 8A and 8B. As can be seen in the drawings, some of the wavelets constituting the original speech segment are omitted due to the compression of the subsegments, and some are used repetitively due to the expansion of the subsegments. It was assumed in FIG. 8 that the pitch pulse signal for each period was obtained by segmenting right after each pitch pulse.

The superposition of the wavelets in the waveform code storage method is equivalent to the superposition of the pitch pulse signals in the source code storage method. Therefore, in the case of the source code storage method, the waveform assembly subblock multiplies each relocated pitch pulse signal by the gain corresponding to the pitch pulse position of the relocated pitch pulse signal found out from the gain information, and finally obtains the desired synthetic excitation signal by superposing the gain-adjusted pitch pulse signals. However, in this case, because most energy is concentrated on the pitch pulse, it may be possible to make the synthetic excitation signal by first obtaining a synthetic excitation signal without gain adjustment by superposing the located pitch pulse signals and then multiplying the synthetic excitation signal without gain adjustment by the energy contour generated at the energy control subblock instead of superposing the constant-gain-adjusted pitch pulse signals. FIG. 3R shows the synthetic excitation signal obtained when the pitch pulse signals of FIG. 3H, FIG. 3K, FIG. 3N are relocated according to such s procedure, so that the pitch pattern becomes the same as for the case of FIG. 3P.

In the source code storage method, the waveform assembly subblock needs to make the synthetic spectral envelope parameters, and two ways are possible, that is, the temporal compression-and-expansion method shown in FIG. 8A and synchronous correspondence method shown in FIG. 8B. If the spectral envelope parameters are continuous functions with respect to time and fully represent the envelope of the speech spectrum, the synthetic spectral envelope parameters can be obtained simply by compressing or expanding temporally the original spectral envelope parameters on a subsegment-by-subsegment basis. In FIG. 8A, the spectral envelope parameter obtained by the sequential analysis method is represented as a dotted curve and the spectral envelope parameter coded by approximating the curve by connecting several points such as A, B, C, etc. with line segments is represented in solid line. Since only the temporal position of each point vary to yield the points A', B', C', etc. as a result of the temporal compression and expansion, such line-segmental coding method is particularly suitable for the case of the temporal compression and expansion. However, in the case of using the block analysis method or the pitch-synchronous analysis method, since the spectral match is not precise and the temporal variation of the spectral envelope parameter is discontinuous, the temporal compression-and-expansion method cannot give the desired synthetic sound quality, it is preferable to use the synchronous correspondence method in which the synthetic spectral envelope parameters are assembled by correlating the spectral envelope parameters for each pitch period interval with each corresponding pitch pulse signal, as shown in FIG. 8B. That is, since the wavelet in the waveform code storage method is equivalent to the pitch pulse signal and the corresponding spectral envelope parameters for the same pitch period interval, the synthetic spectral envelope parameters can be made by synchronously locating the spectral envelope parameters for one period interval at the same period interval of each located pitch pulse signal. In FIG. 8B, k1 which is one of the spectral envelope parameters and k'1 which is the synthetic spectral envelope parameter corresponding to k1 assembled by such methods for the block analysis method and the pitch synchronous analysis method are shown in the solid line and dotted line, respectively. Of course, as stated above, with the spectral envelope parameter obtained by the sequential analysis method the synthetic spectral envelope parameter can be assembled according to the method of FIG. 8A. For example, if the pitch pulse signal for each period has been relocated as shown in FIG. 3R, the spectral envelope parameters for each period are located as shown in FIG. 3S in accordance with the pitch pulse signals.

At the time of the assembly of the synthetic excitation signal and the synthetic spectral envelope parameters in the source code storage method, if the pitch period of the synthesized sound is longer than the original pitch period, a blank interval then results between two adjacent pitch period intervals as shown in oblique lines in FIG. 8. If the pitch period of the synthesized sound is shorter than the original pitch period, overlap intervals in which two adjacent pitch period intervals overlap with each other occur. The overlap interval "fb" and the blank interval "gh" are shown in FIG. 3R and FIG. 3S for example. As previously described, the relocated pitch pulse signals shall be superposed at the time of overlapping. However, it is reasonable that the spectral envelope parameters relocated in accordance with the pitch pulse signals are averaged instead of being superposed at the time of overlapping. Therefore, the assembly method of the synthetic excitation signal and the synthetic spectral envelope parameters with the blank intervals and the overlap intervals taken into consideration is as follows.

The zero-valued samples are inserted in the blank interval at the time of the assembly of the synthetic excitation signal. In the case for voiced fricative sound, a more natural sound can be synthesized if the high-pass filtered noise signal instead of the zero-valued samples is inserted in the blank interval. The relocated pitch pulse signals need to be added in the overlap interval. Since such an addition method is annoying, it is convenient to use a truncation method in which only one signal is selected among two pitch pulse signals overlapped in the overlap interval. The quality of the synthesized sound using the truncation method is not significantly degraded. In FIG. 3R, the blank interval gh was filled with zero samples, and the pitch pulse signal of the fore interval was selected in the overlap interval fb. That is, in case of the occurrence of overlap the fore one among the overlap intervals of each pitch pulse signal was truncated, and this method is physically more meaningful compared to the method in which the pitch pulse signals are made by segmenting right in front of the pitch pulse and at the time of synthesis the latter one among the overlap intervals of the pitch pulse signal is truncated if they overlap, as described previously. However, in reality, either method does not make significant difference in the sound quality of the synthesized sound.

At the time of assembly of the synthetic spectral envelope parameter, it is ideal that the blank interval is filled with the values which vary linearly from a value of the spectral envelope parameter at the end point of the preceding period interval to a value of the spectral envelope parameter at the beginning point of the following period, and that in the overlap interval the spectral envelope parameter gradually vary from the spectral envelope parameter of the preceding period to that of the following period by utilizing the interpolation method in which the average of two overlapped spectral envelope parameters is obtained with weight values which vary linearly with respect to time. However, since these methods are annoying, the following method can be used which is more convenient and does not significantly degrade the sound quality. That is, for the spectral envelope parameter in the blank interval, the value of the spectral envelope parameter at the end point of the preceding period interval may be used repetitively as in FIG. 8*b*, or the value of the spectral envelope parameter at the beginning point of the following period interval be used repetitively, the arithmetic average value of the two spectral envelope parameters may be used, or the values of the spectral envelope parameter at the end and the beginning points of the preceding and the following period intervals may be used respectively before and after the center of the blank interval being a boundary. For the spectral envelope parameter in the overlap interval, simply either part corresponding to the selected pitch pulse may be selected. In FIG. 3S, for example, since the pitch pulse signal for the preceding period interval was selected as the synthetic excitation signal in the overlap interval "fb", the parameter values for the preceding period interval were likewise selected as the synthetic spectral envelope parameters. In the blank interval "gh" of FIG. 8*b* and FIG. 3S, the parameter values of the spectral envelope parameter at the end of the preceding period interval were used repetitively. Of course, in case of FIG. 3S in which the spectral envelope parameter is a continuous function with respect to time, the method in which the last value of the preceding period interval or the first value of the following period interval is used repetitively during the blank interval and the method in which the two values are varied linearly during the blank interval yield the same result.

If once all the synthetic excitation signal and the synthetic spectral envelope parameters for a segment have been assembled, the waveform assembly subblock normally smooths both ends of the assembled synthetic spectral envelope parameters utilizing the interpolation method so that the variation of the spectral envelope parameter is smooth between adjacent speech segments. If the synthetic excitation signal and the synthetic spectral envelope parameters assembled as above are input as the excitation signal and the filter coefficients respectively to the synthesis filter in the waveform assembly subblock, the desired synthetic sound is finally output from the synthesis filter. The synthetic excitation signal obtained when the pitch pulse signals of FIG. 3H, 3K and 3N are relocated such that the pitch pattern is the same as FIG. 3P are shown in FIG. 3R, and the synthetic spectral envelope parameters obtained by corresponding spectral envelope parameters for one period of FIG. 3G, 3J and 3M to the pitch pulse signals in the synthetic excitation signal of FIG. 3R are shown in FIG. 3S. Constituting a time-varying synthesis filter having as the filter coefficients the reflection coefficients varying as shown in FIG. 3S and inputting the synthetic excitation signal as shown in FIG. 3R to the time-varying synthesis filter yield the synthesized sound of FIG. 3T which is almost the same as the synthesized sound of FIG. 3P.

Now comparing the waveform code storage method and the source code storage method, the two methods can be regarded as identical in principle. However, when concatenating the speech segments of bad connectivity with each other, there is a difference that it is possible to synthesize the smoothly connected sound by smoothing the spectral envelope parameters by using the interpolation method in case of the source code storage method, but is impossible in case of the waveform code storage method. Furthermore, the source code storage method requires smaller memory than the waveform code storage method since the waveform of only one period length per wavelet needs to be stored in the source code storage method, and has the advantage that it is easy to integrate the function of the voiced sound synthesis block and the function of the above described unvoiced sound synthesis block. In the case of using the homomorphic analysis method, the cepstrum or the impulse response can be used as the spectral envelope parameter set in the waveform code storage method, whereas it is practically impossible in the source code storage method to use the cepstrum requiring the block-based computation because the duration of the synthesis block having the values of constant synthetic spectral envelope parameters varies block by block as can be seen from the synthetic spectral envelope parameter of FIG. 8B represented in by a solid line. The source code storage method according to the present invention uses the pitch pulse of one period as the excitation pulse. However, it is different from the prior art regular pitch pulse excitation method which intends to substitute the impulse by a sample pitch pulse in that in the present invention the pitch pulse of each period and the spectral envelope parameters of each period corresponding to the pitch pulse are joined to produce the wavelet of each period.

As can be seen from the above description, the present invention is suitable for the coding and decoding of the speech segment of the text-to-speech synthesis system of the speech segmental synthesis method. Furthermore, since the present invention is a method in which the total and partial duration and pitch pattern of the arbitrary phonetic units such as the phoneme, demisyllable, diphone and subsegment, etc. constituting the speech can be changed freely and independently, it can be used in a speech rate conversion system or time-scale modification system which changes the vocal speed at a constant ratio to be faster or slower than the original rate without changing the intonation pattern of the speech, and it can be also used in the singing voice synthesis system or a very low rate speech coding system such as a phonetic vocoder or a segment vocoder which transfers the speech by changing the duration and pitch of template speech segments stored in advance.

Another application area of the present invention is the musical sound synthesis system such as the electronic musical instrument of the sampling method. Since almost all the sound within the gamut of electronic musical instruments are digital waveform-coded, stored and reproduced when requested from the keyboard, etc. in the prior art for the sampling methods for electronic musical instruments, there is a disadvantage that a lot of memory is required for storage of the musical sound. However, if the periodic waveform decomposition and the wavelet relocation method of the present invention is used, the required amount of memory can be significantly reduced because the sounds of various pitches can be synthesized by sampling the tones of only a few sorts of pitches. The musical sound typically consists of 3 parts, that is, an attack, a sustain and a decay. Since the spectrum envelope gradually varies not only between the 3 parts but also within the sustain, timber also varies accordingly. Therefore, if the musical sound segments are coded according to the above described periodic waveform decomposition method and stored taking the appropriate points at which the spectrum varies substantially as the boundary time points, and if the sound is synthesized according to the above described time warping based wavelet relocation method when there are requests from the keyboard, etc., then the musical sound having arbitrary desired pitch can be synthesized. However, in cases where the musical sound signal is deconvolved according to the linear predictive analysis method, since there is a tendency that the precise spectral envelope is not obtained and the pitch pulse is not sharp, it is recommended to reduce the number of spectral envelope parameters used for analysis and difference the signal before analysis.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

We claim:

1. A speech coding method for use in speech synthesis, comprising:

obtaining a set of spectral envelope parameters that represents an estimated spectral envelope of a voiced speech signal by using a spectrum estimation technique;

deconvolving said voiced speech signal, with an impulse response that is a time-domain representation of said estimated spectral envelope of said voiced speech signal, into a pitch pulse train signal having a sequence of periodically located pitch pulses;

forming an excitation signal by appending zero-valued samples to each pitch pulse signal of one period such that one pitch pulse is contained in each period;

convolving said excitation signal with said impulse response into wavelets;

obtaining wavelet codes by coding the wavelets of all periods; and storing in memory wavelet codes and information of corresponding pitch pulse locations of all wavelets, for use in speech synthesis.

2. A speech synthesis method in a speech synthesis system which uses the speech coding method of claim 1, comprising:

determining appropriate time points which represent a desired pitch pattern;

selecting from all wavelet codes a wavelet code whose pitch pulse location is nearest to each of said time points;

obtaining a wavelet signal by decoding each selected wavelet code;

localizing said wavelet signal so that the pitch pulse location of said wavelet signal coincides with said time point; and superposing all of said localized wavelet signals, thereby obtaining a synthetic speech.

3. The speech coding method of claim 1 wherein a wavelet code is formed by mating information obtained by coding said pitch pulse signal of one period, with information obtained by coding a set of said spectral envelope parameters of the same period as the one period of said pitch pulse signal.

4. A speech synthesis method in a speech synthesis system which uses the speech coding method of claim 3, comprising:

determining appropriate time points which represent a desired pitch pattern;

selecting from all wavelet codes a wavelet code whose pitch pulse location is nearest to each of said time points;

decoding a coded pitch pulse signal and a set of coded spectral envelope parameters of each selected wavelet code;

forming an excitation signal by appending zero-valued samples after each decoded pitch pulse signal;

obtaining a wavelet signal by convolving said excitation signal with an impulse response which is a time-domain representation of a set of said decoded spectral envelope parameters;

localizing said wavelet signal so that pitch pulse location of said wavelet signal coincides with said time point; and superposing all of said localized wavelet signals, thereby obtaining a synthetic speech.

5. A speech synthesis method in a speech synthesis system which uses the speech coding method of claim 3, comprising:

determining appropriate time points which represent a desired pitch pattern;

selecting from all wavelet codes a wavelet code whose pitch pulse location is nearest to each of said time points;

decoding a coded pitch pulse signal and a set of coded spectral envelope parameters in each selected wavelet code;

localizing said decoded pitch pulse signal so that the pitch pulse location of said decoded pitch pulse signal coincides with said time point;

forming an excitation signal by superposing all of said localized pitch pulse signals; and convolving said excitation signal with an impulse response which is a time-domain representation of a set of said decoded spectral envelope parameters, thereby obtaining a synthetic speech.

6. A speech coding method for use in speech synthesis, comprising:

obtaining a set of spectral envelope parameters of a voice speech signal by spectrum estimation;

deconvolving the voice speech signal, with an impulse response that is representative of the spectral envelope parameters set of the voice speech signal, into a pitch pulse train signal having a plurality of pitch pulses;

forming an excitation signal by segmenting the pitch pulse train signal such that one pitch pulse is contained in each period;

convolving the excitation signal with the impulse response into a plurality of wavelets; and storing the plurality of wavelets for use in speech synthesis.

7. The speech coding method of claim 6 wherein the step of forming an excitation signal further includes the step of appending zero-valued samples to each segmented pitch pulse train signal of one period.

8. A speech coding method for use in speech synthesis, comprising:

obtaining a set of spectral envelope parameters of a voice speech signal by spectrum estimation;

deconvolving the voice speech signal, with an impulse response that is representative of the set of spectral envelope parameters, into a pitch pulse train signal having a substantially flat spectral envelope and a sequence of periodically located pitch pulses;

forming an excitation signal by adding zero-valued samples to each pitch pulse train signal of one period such that one pitch pulse is contained in each period;

convolving the excitation signal with the impulse response into wavelets with each wavelet being associated with one pitch pulse; and storing the wavelets and the locations of the associated pitch pulses in memory for use in speech synthesis.

* * * * *